US010559858B2

(12) United States Patent
Goitsuka et al.

(10) Patent No.: US 10,559,858 B2
(45) Date of Patent: Feb. 11, 2020

(54) BATTERY PACK

(71) Applicant: TOYOTA JIDOSHA KABUSHIKI KAISHA, Toyota-shi, Aichi-ken (JP)

(72) Inventors: Shinya Goitsuka, Okazaki (JP); Koichi Tanaka, Okazaki (JP); Hiroya Mizuta, Nagoya (JP); Akihiro Kosaki, Aichi-ken (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/898,242

(22) Filed: Feb. 16, 2018

(65) Prior Publication Data

US 2018/0241092 A1    Aug. 23, 2018

(30) Foreign Application Priority Data

Feb. 17, 2017    (JP) .................. 2017-027766

(51) Int. Cl.
| | | |
|---|---|---|
| *H01M 10/42* | (2006.01) | |
| *A62C 3/07* | (2006.01) | |
| *A62C 3/16* | (2006.01) | |
| *A62C 35/10* | (2006.01) | |
| *H01M 2/10* | (2006.01) | |
| *B60L 50/64* | (2019.01) | |

(Continued)

(52) U.S. Cl.
CPC ........... *H01M 10/4235* (2013.01); *A62C 3/07* (2013.01); *A62C 3/16* (2013.01); *A62C 35/10* (2013.01); *B60L 50/64* (2019.02); *H01M 2/1072* (2013.01); *H01M 2/1083* (2013.01); *H01M 2/1094* (2013.01); *B60K 1/04* (2013.01); *B60K 2001/0416* (2013.01); *B60L 58/10* (2019.02); *H01M 2200/10* (2013.01); *H01M 2220/20* (2013.01); *Y02T 10/7005* (2013.01); *Y02T 10/705* (2013.01)

(58) Field of Classification Search
CPC ......... H01M 10/4235; H01M 2200/10; H01M 2220/20; H01M 2/1083; H01M 2/1072; H01M 2/1094; B60L 50/64; B60L 58/10; A62C 35/10; A62C 3/16; A62C 3/07; Y02T 10/705; Y02T 10/7005; B60K 2001/0416; B60K 1/04
See application file for complete search history.

(56) References Cited

U.S. PATENT DOCUMENTS

2016/0193489 A1    7/2016    Taniguchi et al.

FOREIGN PATENT DOCUMENTS

| EP | 3050595 A1 | 8/2016 |
| JP | 41-021104 B1 | 12/1966 |

(Continued)

OTHER PUBLICATIONS

Partial Translation of the Communication dated Aug. 6, 2019, from the Japanese Patent Office in counterpart Application No. 2017-027766.

*Primary Examiner* — Cynthia K Walls
(74) *Attorney, Agent, or Firm* — Sughrue Mion, PLLC

(57) ABSTRACT

A battery pack installed in a vehicle, the battery pack includes: a battery assembly; a battery module including a module case that houses the battery assembly; a pack case that houses the battery module; and a fire-extinguishing agent releasing unit including fire-extinguishing agent, disposed between the battery module and the pack case, wherein the fire fire-extinguishing agent releasing unit is configured to release the fire-extinguishing agent between the pack case and the module case.

5 Claims, 19 Drawing Sheets

(51) Int. Cl.
*B60L 58/10* (2019.01)
*B60K 1/04* (2019.01)

(56) References Cited

FOREIGN PATENT DOCUMENTS

| | | |
|---|---|---|
| JP | 2011-54353 A | 3/2011 |
| JP | 2013-136266 A | 7/2013 |
| JP | 2014-033825 A | 2/2014 |
| JP | 2015-071397 A | 4/2015 |
| JP | 2017-189068 A | 10/2017 |
| WO | 2015/045195 A1 | 4/2015 |

BATTERY PACK

INCORPORATION BY REFERENCE

The disclosure of Japanese Patent Application No. 2017-027766 filed on Feb. 17, 2017 including the specification, drawings and abstract is incorporated herein by reference in its entirety.

BACKGROUND

1. Technical Field

The present disclosure relates to a battery pack installed in a vehicle.

2. Description of Related Art

Examples of literatures that disclose a battery pack containing a battery module include Japanese Patent Application Publications No. 2014-33825, No. 2013-136266, and No. 2015-071397.

The battery pack disclosed in JP 2014-33825 A includes a device that ejects a fire-extinguishing agent toward a battery assembly if any abnormality of cells composing the battery assembly is detected.

The vehicle disclosed in JP 2013-136266 A includes a battery pack having battery modules housed in a pack case. A heat absorbing part disposed inside the pack case and a heat releasing part disposed outside the pack case are connected to each other through a coolant circulation path, through which a coolant is circulated to cool the battery modules.

A fire-extinguishing agent feed port through which a fire-extinguishing agent can be fed is provided in a part of the coolant circulation path that is located outside the pack case, while a brittle portion that breaks under the pressure of the fire-extinguishing agent when it is fed is provided in a part of the coolant circulation path that is located inside the pack case. Thus provided with the fire-extinguishing agent feed port and the brittle portion, this coolant circulation path can serve as a route for supplying the fire-extinguishing agent into the pack case.

In the vehicle disclosed in JP 2015-071397 A, a first wiring harness that is connected to an inverter provided on a front side in the vehicle and a second wiring harness that is routed out of a battery pack mounted on a rear side in the vehicle are arranged under a floor panel and connected to each other in a junction box.

SUMMARY

The battery pack disclosed in JP 2014-33825 A is configured so that a fire-extinguishing agent is ejected directly toward the battery assembly, which may result in short-circuit between the cells. The battery pack disclosed in JP 2013-136266 A is configured so that a fire-extinguishing agent is supplied from outside, and therefore requires waiting for the arrival of a worker who supplies a fire-extinguishing agent. Thus, it takes time before a fire-extinguishing agent is fed into the pack case.

Moreover, the battery pack disclosed in JP 2013-136266 A is configured so that the inside of the pack case is immersed in a fire-extinguishing agent supplied through the pre-installed coolant circulation path. Thus, unable to specifically cool a heat conduction path through which heat is conducted from a heat generation source, this vehicle consumes a large amount of fire-extinguishing agent.

Here, a peripheral wall of the pack case has an opening through which wiring is routed out or the coolant circulation path is routed out. For example, when the battery pack is disposed indoors, this opening is sometimes left open to the outside without being sealed gas-tightly or liquid-tightly. In such cases, any heat generated inside the pack case is released through the opening to the outside of the pack case. Thus, members around the battery pack are heated by the heat released through the opening to the outside of the pack case.

In the case of the configuration in which the second wiring harness is routed out from the battery pack toward the front side of the vehicle as disclosed in JP 2015-071397 A, when an impact is exerted from the rear side of the vehicle due to a rear-end collision etc., the second wiring harness may get caught and broken between the battery pack and a component around the battery pack. In such cases, heat is generated from the break in the second wiring harness, and the generated heat is conducted through the second wiring harness. Thus, the heat resulting from the wiring breakage is conducted into the battery pack through the second wiring harness.

The present disclosure allows quick release of a fire-extinguishing agent inside a pack case while avoiding short-circuit of a battery assembly disposed inside a module case due to accidental activation of a fire-extinguishing agent releasing unit.

The present disclosure can reduce the consumption of a fire-extinguishing agent and yet can suppress the temperature rise of wiring that constitutes a heat conduction path.

The present disclosure can prevent heat from being released to the outside through an opening provided in the pack case.

The present disclosure can prevent heat from being conducted into the pack case that houses a battery module through wiring routed out of the pack case.

One aspect of the present disclosure is a battery pack installed in a vehicle. The battery pack includes: a battery assembly; a battery module including a module case that houses the battery assembly; a pack case that houses the battery module; and a fire-extinguishing agent releasing unit including fire-extinguishing agent, disposed between the battery module and the pack case. The fire fire-extinguishing agent releasing unit is configured to release the fire-extinguishing agent between the pack case and the module case.

The fire-extinguishing agent releasing unit may include: a fire-extinguishing agent-enclosing body that encloses the fire-extinguishing agent; and a seal that is disposed in the fire-extinguishing agent-enclosing body and configured to be melted by heating.

If the vehicle is hit, an impact is exerted on the battery pack, causing the battery module housed inside the pack case of the battery pack to move toward the opposite side from the hit side. As a result, internal components disposed between the module case and the pack case, such as electronic devices and wires arranged inside the pack case, may be damaged by the impact force and generate heat inside the pack case.

As described above, the fire-extinguishing agent releasing unit is configured to include a part disposed between the battery module and the pack case, and to release the fire-extinguishing agent between the pack case and the module case as the sealed part is heated and melted inside the pack case. Thus, when heat is generated inside the pack case, the fire-extinguishing agent can be quickly released between the pack case and the module case, without the need to wait for the arrival of a worker who supplies a fire-extinguishing agent from outside.

Since the battery assembly is housed inside the module case, even when the fire-extinguishing agent is released due to accidental activation of the fire-extinguishing agent releasing unit, this fire-extinguishing agent is not directly supplied to the battery assembly. Thus, it is possible to avoid a situation in which the fire-extinguishing agent released due to accidental activation of the fire-extinguishing agent releasing unit causes short-circuit of the battery assembly disposed inside the module case.

The module case may include a member made of a resin; and the pack case may include a member made of a metal.

When the battery pack has the above configuration, even when a resin member that has a lower melting point and melts more easily than a metal member is used as the module case, the temperature rise of this resin member can be suppressed as the fire-extinguishing agent is released between the pack case and the module case. Thus, it is possible to suppress the temperature rise of the battery assembly due to the temperature rise of the resin member.

The seal may have a shape of a tube with both ends sealed, and be disposed between the battery module and the pack case.

When the battery pack has the above configuration, the sealed part having a shape of a tube with both ends hermetically closed can be housed inside the pack case. Thus, a route for circulating a fire-extinguishing agent from the outside to the inside of the pack case can be omitted, which can simplify the configuration of the battery pack.

The battery pack may further include wiring arranged between the module case and the pack case. The fire-extinguishing agent releasing unit may be configured to release the fire-extinguishing agent toward the wiring.

When the battery pack has the above configuration, in the event of a collision of the vehicle, the fire-extinguishing agent is released toward the wiring as the sealed part of the fire-extinguishing agent releasing unit is melted by being heated to a predetermined temperature or higher under the heat generated from a break in the wiring. Thus, it is possible to release the fire-extinguishing agent specifically toward the heat generation point and the heat conduction path so as to suppress the temperature rise of the heat generation point and the heat conduction path. Moreover, compared with immersing the inside of the pack case in the fire-extinguishing agent, releasing the fire-extinguishing agent specifically toward the heat generation point and the heat conduction path can reduce the amount of fire-extinguishing agent to be released.

The battery pack may further include an electronic device disposed outside the module case but inside the pack case. The wiring may include connection wiring that connects the battery module and the electronic device to each other, and the fire-extinguishing agent releasing unit may include a part that is provided along the connection wiring.

In the event of a collision of the vehicle, the connection wiring is likely to get caught and broken between the pack case and the displaced module case. When the fire-extinguishing agent releasing unit is configured as described above to include a part provided along the connection wiring that is prone to breakage, in the event of breakage of the connection wiring, the fire-extinguishing agent is released toward the connection wiring that constitutes a heat generation source as well as heat conduction path. Thus, the fire-extinguishing agent can be released specifically toward the heat generation point and the heat conduction path. As a result, this battery pack can reduce the consumption of the fire-extinguishing agent and yet can suppress the temperature rise of the heat generation point and the heat conduction path more advantageously.

The pack case may include a front wall, and a rear wall, arranged such that the front wall and the rear wall face each other in a front-rear direction of the vehicle, the wiring may include front-side wiring that is arranged inside the pack case, between the front wall and the battery module, and at least a part of the fire-extinguishing agent releasing unit may be disposed above the front-side wiring.

If the vehicle is hit from behind, the battery module disposed inside the pack case moves toward the front side. In this case, the front-side wiring arranged inside the pack case between the front wall and the battery module is likely to get caught and broken between the pack case and the battery module.

When a part of the fire-extinguishing agent releasing unit is disposed above the front-side wiring as described above, in the event of breakage of the front-side wiring, the fire-extinguishing agent is released from the part of the fire-extinguishing agent releasing unit that is located above the front-side wiring, toward the front-side wiring that constitutes a heat generation source as well as heat conduction path. Thus, the fire-extinguishing agent can be released specifically toward the heat generation point and the heat conduction path. As a result, this battery pack can reduce the consumption of the fire-extinguishing agent and yet can suppress the temperature rise of the heat generation point and the heat conduction path more advantageously.

The pack case may include a partition extending from a side of the rear wall toward a front side of the vehicle, the partition may separate an inside of the pack case into an upper space and a lower space, and at least a part of the front-side wiring may pass through a clearance between a front end of the partition and the front wall.

If the vehicle is hit from behind, the partition is likely to be pushed along with the rear wall and move toward the front side. Therefore, when the front-side wiring includes a part that passes through the clearance between the front end of the partition and the front wall, this part of the front-side wiring is likely to get caught and broken between the front wall and the front end of the partition.

When the battery pack has the above configuration, the fire-extinguishing agent is released from the part of the fire-extinguishing agent releasing unit that is located above the front-side wiring, toward the front-side wiring that constitutes a heat generation source as well as heat conduction path. Thus, the fire-extinguishing agent can be released specifically toward the heat generation point and the heat conduction path. As a result, this battery pack can reduce the consumption of the fire-extinguishing agent and yet can suppress the temperature rise of the heat generation point and the heat conduction path more advantageously.

The battery pack may further include outside wiring that is routed out of the pack case. At least a part of the fire-extinguishing agent releasing unit may be disposed above the outside wiring.

If the vehicle is hit, the pack case also moves. As a result, the outside wiring that is routed out of the pack case may get caught and broken between the pack case and a member disposed around the pack case. In such cases, heat is generated from the break in the outside wiring, and the generated heat is conducted through the outside wiring toward the battery pack.

When the fire-extinguishing agent releasing unit includes a part that is disposed above the outside wiring as described above, the fire-extinguishing agent can be released toward the outside wiring. Thus, it is possible to release the fire-extinguishing agent specifically toward the heat generation point and the heat conduction path so as to suppress the temperature rise of the heat generation point and the heat conduction path. As a result, heat from outside the pack case can be prevented from being conducted through the outside wiring to the battery pack.

The pack case may include a front wall, a rear wall, and a peripheral wall, the front wall and the rear wall may be arranged such that the front wall and the rear wall face each other in a front-rear direction of the vehicle, the peripheral wall may connect a peripheral edge of the front wall and a peripheral edge of the rear wall to each other, may include an opening, and at least a part of the fire-extinguishing agent releasing unit may be disposed above the opening, on an inner side of the peripheral wall.

When the fire-extinguishing agent releasing unit is configured to include a part that is located above the opening, on the inner side of the peripheral wall of the pack case as described above, the fire-extinguishing agent can be released toward the vicinity of the opening and toward the heat generation point located on the inner side of the peripheral wall having the opening, before the generated heat passes through the opening. Thus, it is possible to prevent the heat from being released to the outside through the opening provided in the pack case.

The battery pack includes: a battery assembly; a battery module including a module case that houses the battery assembly; a pack case that houses the battery module; and a fire-extinguishing agent releasing unit including fire-extinguishing agent, disposed between the battery module and the pack case. The fire fire-extinguishing agent releasing unit is configured to release the fire-extinguishing agent between the pack case and the module case. The fire-extinguishing agent releasing unit may include: a fire-extinguishing agent-enclosing body that encloses the fire-extinguishing agent; and a seal that is disposed in the fire-extinguishing agent-enclosing body and configured to be melted by heating. The battery pack may further include wiring arranged between the module case and the pack case. The fire-extinguishing agent releasing unit may be configured to release the fire-extinguishing agent toward the wiring.

If the vehicle is hit, an impact is exerted on the battery pack, causing the battery module housed inside the pack case of the battery pack to move toward the opposite side from the hit side. As a result, the wiring arranged between the battery module and the pack case may get caught and broken between the battery module and the pack case. In such cases, heat is generated from the break in the wiring, and the generated heat is conducted through the wiring toward the battery module.

In such cases, when the battery pack has the above configuration, the fire-extinguishing agent is released toward the wiring as the sealed part of the fire-extinguishing agent releasing unit is melted by being heated to a predetermined temperature or higher under the heat generated from the break in the wiring. Thus, it is possible to release the fire-extinguishing agent specifically toward the heat generation point and the heat conduction path so as to suppress the temperature rise of the heat generation point and the heat conduction path. Moreover, compared with immersing the inside of the pack case in the fire-extinguishing agent, releasing the fire-extinguishing agent specifically toward the heat generation point and the heat conduction path can reduce the amount of fire-extinguishing agent to be released.

The battery pack includes: a battery assembly; a battery module including a module case that houses the battery assembly; a pack case that houses the battery module; and a fire-extinguishing agent releasing unit including fire-extinguishing agent, disposed between the battery module and the pack case. The fire fire-extinguishing agent releasing unit is configured to release the fire-extinguishing agent between the pack case and the module case. The fire-extinguishing agent releasing unit may include: a fire-extinguishing agent-enclosing body that encloses the fire-extinguishing agent; and a seal that is disposed in the fire-extinguishing agent-enclosing body and configured to be melted by heating. The pack case may include a front wall, a rear wall, and a peripheral wall, the front wall and the rear wall may be arranged such that the front wall and the rear wall face each other in a front-rear direction of the vehicle, the peripheral wall may connect a peripheral edge of the front wall and a peripheral edge of the rear wall to each other, may include an opening, and at least a part of the fire-extinguishing agent releasing unit may be disposed above the opening, on an inner side of the peripheral wall.

If the vehicle is hit, internal components disposed between the module case and the pack case, such as electronic devices and wires arranged inside the pack case, may be damaged by the impact force and generate heat inside the pack case. When the opening is provided in the peripheral wall of the pack case, the heat generated inside the pack case can be conducted through this opening to an inflammable member etc. disposed around the battery pack.

When the fire-extinguishing agent releasing unit is configured to include a part that is located above the opening, on the inner side of the peripheral wall of the pack case as described above, the fire-extinguishing agent can be released toward the vicinity of the opening and toward the heat generation point located on the inner side of the peripheral wall having the opening, before the generated heat passes through the opening. Thus, it is possible to prevent the heat from being released to the outside through the opening provided in the pack case.

The battery pack includes: a battery assembly; a battery module including a module case that houses the battery assembly; a pack case that houses the battery module; and a fire-extinguishing agent releasing unit including fire-extinguishing agent, disposed between the battery module and the pack case. The fire fire-extinguishing agent releasing unit is configured to release the fire-extinguishing agent between the pack case and the module case. The battery pack may further include outside wiring that is routed out of the pack case. At least a part of the fire-extinguishing agent releasing unit may be disposed above the outside wiring.

If the vehicle is hit, the pack case also moves. As a result, the wiring that is routed out of the pack case may get caught and broken between the pack case and a member disposed around the pack case. In such cases, heat is generated from the break in the wiring, and the generated heat is conducted through the wiring toward the battery pack.

When the fire-extinguishing agent releasing unit capable of releasing the fire-extinguishing agent is configured to include a part disposed above the wiring that is located outside the pack case, it is possible to release the fire-extinguishing agent toward the heat generation point and the heat conduction path while the generated heat is conducted through the wiring toward the battery pack, so as to suppress the temperature rise of the heat generation point and the heat conduction path. As a result, the heat can be prevented from being conducted into the pack case that houses the battery module through the wiring routed out of the pack case.

According to the above battery pack, a battery pack can be provided that allows quick release of a fire-extinguishing agent inside a pack case while avoiding short-circuit of a battery module due to accidental activation of a fire-extinguishing agent releasing unit.

According to the above battery pack, a battery pack can be provided that can reduce the consumption of a fire-extinguishing agent and yet can suppress the temperature rise of wiring that constitutes a heat conduction path.

According to the above battery pack, a battery pack can be provided that can prevent heat from being released to the outside through an opening provided in a pack case.

According to the above battery pack, a battery pack can be provided that can prevent heat from being conducted into a pack case that houses the battery module through the wiring routed out of the pack case.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
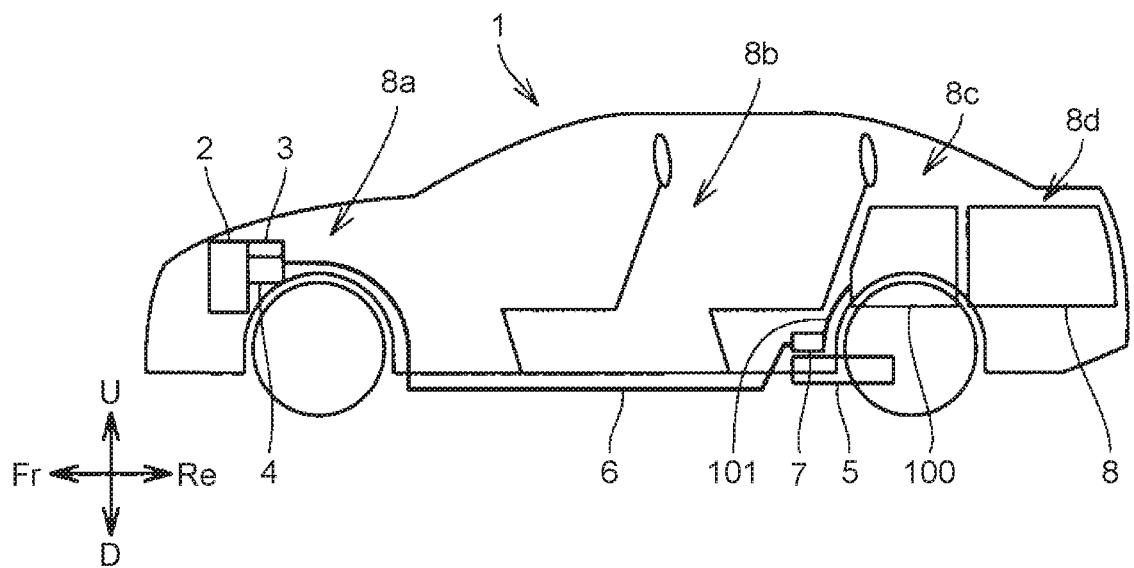
FIG. 1 is a side view of a vehicle equipped with a battery pack according to Embodiment 1.

Embodiments of the present disclosure will be described below in detail with reference to the drawings. The same or common parts of the following embodiments will be denoted by the same reference signs in the drawings so as to avoid repeating the same description.

In the following embodiments, a case where a battery pack is installed in a hybrid electric vehicle will be described as an example, but the battery pack is not limited to this example and may instead be installed in an electric vehicle.

The arrow U and the arrow D indicated in the drawings respectively represent an upper side and a lower side in the direction of gravitational force. The arrow L and the arrow R respectively represent a left side and a right side in a width direction of the vehicle. The arrow Fr and the arrow Re respectively represent a front side and a rear side in a front-rear direction of the vehicle.

Figure 2:
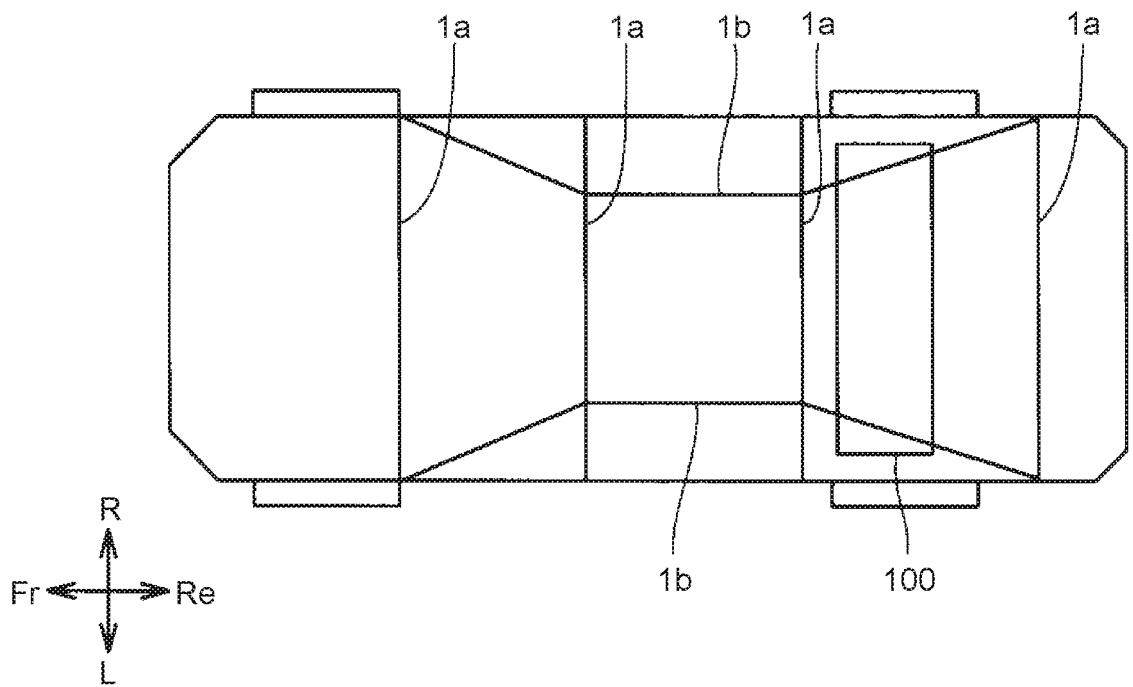
FIG. 2 is a schematic view showing an installation position of the battery pack according to Embodiment 1.

FIG. 1 is a side view of a vehicle equipped with a battery pack according to Embodiment 1. FIG. 2 is a schematic view showing an installation position of the battery pack according to Embodiment 1. A vehicle 1 equipped with a battery pack 100 according to Embodiment 1 will be described with reference to FIG. 1 and FIG. 2.

As shown in FIG. 1, an engine compartment 8a, a cabin 8b, a battery pack installation area 8c, and a luggage room 8d are formed inside the vehicle 1.

The engine compartment 8a is formed in a front part of the vehicle 1. An engine 2, a rotating electric machine 3, and a CPU 4 are disposed in the engine compartment 8a. The cabin 8b is formed on the rear side of the engine compartment 8a.

The battery pack installation area 8c is formed on the rear side of the cabin 8b but the front side of the luggage room 8d. The battery pack installation area 8c is formed on the rear side of a rear seat that is installed in the cabin 8b. A main body (a pack case 10 (see FIG. 3) to be described later) of the battery pack 100 is disposed in the battery pack installation area 8c. The luggage room 8d is formed in a rear part of the vehicle. The luggage room 8d is formed on the rear side of the battery pack installation area 8c.

As shown in FIG. 2, the vehicle 1 includes a pair of side members 1b and a plurality of cross members 1a. The side members 1b extend along the front-rear direction. The cross members 1a extend in a left-right direction. The cross members 1a are arrayed at intervals along the front-rear direction.

When seen from an up-down direction, the battery pack 100 is disposed between a pair of rear wheels. The battery pack 100 extends along the left-right direction. The battery pack 100 is provided across those portions of the side members 1b that are located between the rear wheels. With the battery pack 100 thus disposed, if the vehicle 1 is hit from a lateral side, an impact exerted on the battery pack 100 is reduced by the rear wheels. Alternatively, the battery pack 100 may be disposed in a space between the side members 1b. In this case, the impact exerted on the battery pack 100 is reduced also by the side members 1b.

The vehicle 1 has a driving device including the engine 2, the rotating electric machine 3, and the CPU 4, a fuel tank 5, the battery pack 100, and a wiring harness 6.

The engine 2 uses fuel supplied from the fuel tank 5 to generate driving force for driving wheels. The CPU 4 includes a converter and an inverter. The CPU 4 raises the voltage of direct-current electricity supplied from the battery pack 100, and converts the direct-current electricity with a raised voltage into alternating-current electricity. Using the alternating-current electricity supplied from the CPU 4, the rotating electric machine 3 generates electricity for driving the wheels. The CPU 4 can control driving of the rotating electric machine 3, for example, the rotation speed thereof, by adjusting the frequency etc. of the alternating-current electricity supplied to the rotating electric machine 3. The rotating electric machine 3 functions mainly as a power generator.

The wiring harness 6 electrically connects the CPU 4 and the battery pack 100 to each other. The wiring harness 6 sends electricity from the battery pack 100 to the CPU 4. One end of the wiring harness 6 is connected to the CPU 4. The other end of the wiring harness 6 is connected to wiring 101 (outside wiring) that is routed out of the pack case of the battery pack 100 to be described later. The wiring harness 6 and the wiring 101 are connected to each other in a junction box 7. The wiring 101 constitutes a part of the battery pack 100.

Figure 3:
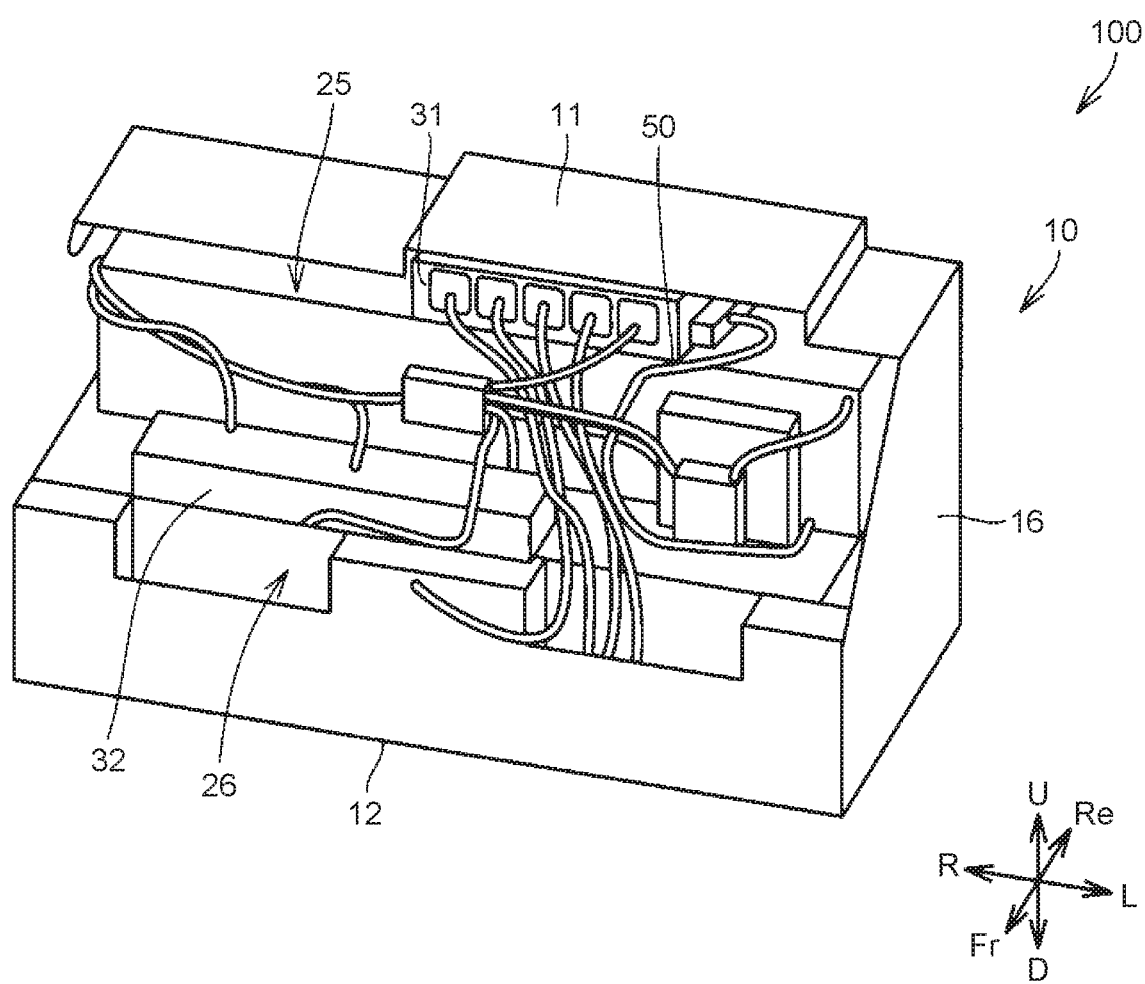
FIG. 3 is a perspective view of the battery pack according to Embodiment 1.
Figure 4:
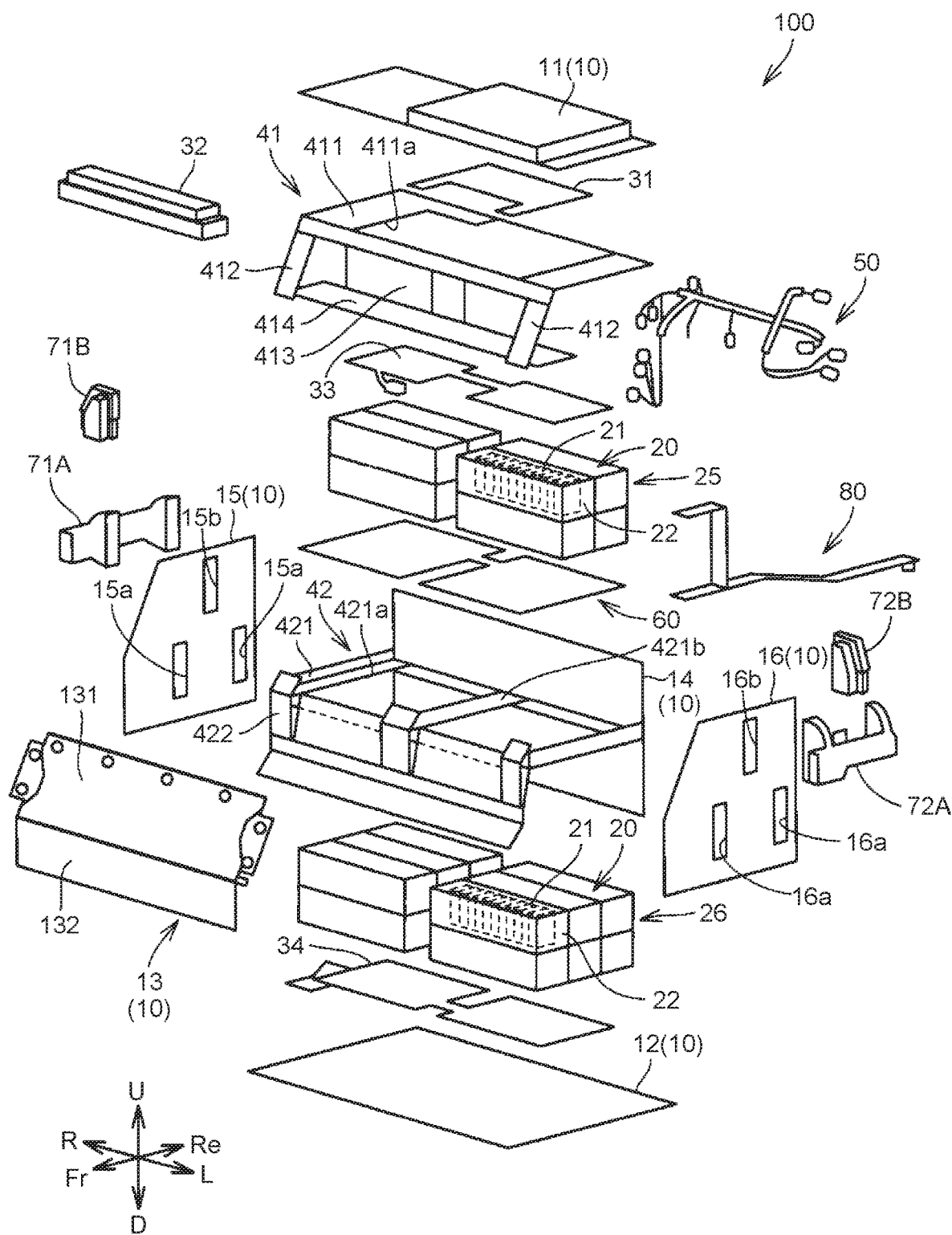
FIG. 4 is an exploded perspective view of the battery pack according to Embodiment 1.

FIG. 3 is a perspective view of the battery pack according to Embodiment 1. FIG. 4 is an exploded perspective view of the battery pack according to Embodiment 1. The structure of the battery pack 100 according to Embodiment 1 will be described with reference to FIG. 3 and FIG. 4.

As shown in FIG. 3 and FIG. 4, the battery pack 100 mainly includes the pack case 10, a plurality of battery modules 20, a fire-extinguishing agent releasing unit 90 (see FIG. 5), wiring 50, and a plurality of electronic devices 31, 32, 33, 34.

The battery pack 100 further includes air intake ducts 71A, 72A, air exhaust air ducts 71B, 72B, an upper frame 41, a lower frame 42, and a smoke exhaust duct 80.

The pack case 10 mainly houses the battery modules 20. Specifically, the pack case 10 houses the battery modules 20, the fire-extinguishing agent releasing unit 90, the wiring 50, a partition 60, the upper frame 41, and the lower frame 42. The pack case 10 also houses a part of the smoke exhaust duct 80.

The pack case 10 has an upper wall 11, a lower wall 12, a front wall 13, a rear wall 14, a side wall 15, and a side wall 16. The upper wall 11 and the lower wall 12 are disposed one above the other in the up-down direction of the vehicle. The front wall 13, the rear wall 14, the side wall 15, and the side wall 16 constitute a peripheral wall that connects a peripheral edge of the upper wall 11 and a peripheral edge of the lower wall 12 to each other.

The upper frame 41 and the lower frame 42 hold the pack case 10 while reinforcing the pack case 10. The upper frame 41 and the lower frame 42 define a space in which the battery modules 20 are disposed. A lower part of the upper frame 41 is fixed to an upper part of the lower frame 42.

The upper frame 41 includes a rectangular frame 411, projecting portions 412, a wall portion 413, and a mount portion 414. The rectangular frame 411 forms an upper part of the upper frame 41. The rectangular frame 411 has an opening 411a so as to avoid interference with the electronic device 31 and the electronic device 33.

The projecting portions 412 are respectively connected to right and left ends located on a front side of the rectangular frame 411. The projecting portions 412 are inclined downward while extending toward the front side. The wall portion 413 is provided substantially parallel to the up-down direction. An upper end of the wall portion 413 is connected to a front end of the rectangular frame 411. The mount portion 414 is connected to a lower end of the wall portion 413.

The mount portion 414 has a plate-like shape. The mount portion 414 is provided so as to protrude from the wall portion 413 toward the front side. The electronic device 32 is mounted on the mount portion 414.

The lower frame 42 includes a rectangular frame 421 and front wall reinforcing portions 422. The rectangular frame 421 forms an upper part of the lower frame 42. A reinforcing portion 421b that connects a front part and a rear part of the rectangular frame 421 is provided at a center part of the rectangular frame 421. Openings 421a are respectively formed on both sides of the reinforcing portion 421b in the left-right direction. The partition 60 is mounted on the rectangular frame 411 so as to cover the openings 421a. The rectangular frame 411 supports the partition 60.

The front wall reinforcing portions 422 are connected to a front part of the rectangular frame 421, respectively at right and left ends and a center part. The front wall reinforcing portions 422 each have a plate-like shape. The front wall reinforcing portions 422 are provided substantially parallel to the up-down direction.

The upper wall 11 has a plate-like shape and is partially raised so as to avoid interference with the electronic device 31. The upper wall 11 is fixed to the rectangular frame 411 of the upper frame 41. The lower wall 12 has a plate-like shape. The lower wall 12 is fixed to a lower end of the lower frame 42.

The front wall 13 has an inclined portion 131 and a vertical wall portion 132. The inclined portion 131 is inclined toward the front side while extending downward. The vertical wall portion 132 is connected to a lower end of the inclined portion 131. The vertical wall portion 132 is substantially parallel to the up-down direction.

The inclined portion 131 of the front wall 13 is fixed to the projecting portions 412 of the upper frame 41. The vertical wall portion 132 of the front wall 13 is fixed to the front wall reinforcing portions 422 of the lower frame 42.

The rear wall 14 has a plate-like shape. The rear wall 14 is fixed to a rear end of the rectangular frame 411 of the upper frame 41 and a rear end of the rectangular frame 421 of the lower frame 42.

The side wall 15 has a plate-like shape. The side wall 15 is fixed to a right-side end of the upper frame 41 and a right-side end of the lower frame 42. The side wall 15 has openings 15a, 15b. The openings 15a are covered with the air intake duct 71A. The opening 15b is covered with the air exhaust duct 71B.

The side wall 16 has a plate-like shape. The side wall 16 is fixed to a left-side end of the upper frame 41 and a left-side end of the lower frame 42. The side wall 16 has openings 16a, 16b. The openings 16a are covered with the air intake duct 72A. The opening 16b is covered with the air exhaust duct 72B.

Cold air as a coolant is supplied through the air intake duct 71A mainly to a right-side space inside the pack case 10. The air mainly in the right-side space is discharged through the air exhaust duct 71B. Thus circulating the cold air through the right-side space can cool the battery modules 20 disposed in the right-side space.

Cold air as a coolant is supplied through the air intake duct 72A mainly to a left-side space inside the pack case 10. The air mainly in the left-side space is discharged through the air exhaust duct 72B. Thus circulating the cold air through the left-side space can cool the battery modules 20 disposed in the left-side space.

The battery module 20 includes a battery assembly that is composed of a plurality of cells 21 disposed in a row, and a module case 22 that houses this battery assembly. For example, the module case 22 is formed by a resin member.

The battery modules 20 include a first module 25 and a second module 26. For example, the first module 25 is composed of two battery module groups disposed side by side in the left-right direction, with each battery module group having the battery modules 20 disposed in two rows and two lines. For example, the second module 26 is composed of two battery module groups disposed side by side in the left-right direction, with each battery module group having the battery modules disposed in three rows and two lines.

The first module 25 is disposed between the rectangular frame 411 and the partition 60. The second module 26 is disposed between the partition 60 and the lower wall 12.

The partition 60 extends from the side of the rear wall 14 toward the front side so as to partition a space inside the pack case 10 into an upper space and a lower space. The mount portion 414 of the upper frame 41 is mounted on a front end side of the partition 60. A rear end of the partition 60 may be in contact with an inner surface of the rear wall 14, or may be separated from the inner surface of the rear wall 14.

The electronic devices 31, 32, 33, 34 are disposed outside the module case 22 but inside the pack case 10.

The electronic device 31 is disposed between the upper wall 11 and the first module 25. For example, the electronic device 31 monitors the state of the cells 21 composing the battery assembly. For example, the electronic device 31 is a battery ECU. The electronic device 31 is mounted on a circuit board that constitutes the electronic device 33.

The electronic device 33 is mounted on an upper surface of the first module 25. The electronic device 33 includes the circuit board and a current sensor etc. mounted on this circuit board. The current sensor detects a charge current input into the cells 21 and a discharge current output from the cells 21. The electronic device 31 determines the state of charge of the cells 21 on the basis of an output signal of the current sensor etc.

The electronic device 32 is mounted on the mount portion of the upper frame 41. For example, the electronic device 32 is a junction box. The electronic device 32 includes a relay circuit, fuse, etc. (not shown). The electronic device 32 is connected to the wiring 101. The output of the battery modules 20 is supplied to the CPU 4 outside the pack case 10 through the electronic device 32 and the wiring 101.

The electronic device 34 is disposed between the second module 26 and the lower wall 12. The electronic device 34 has a substantially plate-like shape. The electronic device 34 includes a heat generation body (not shown) and a heat generation body support part. When the temperature of the battery module 20 is low, the electronic device 34 heats the air inside the pack case 10. The heat generation body generates heat as a current is applied thereto.

The wiring 50 is arranged between the module case 22 and the pack case 10. The wiring 50 includes a plurality of wires. The wiring 50 connects the electronic devices 31, 32, 33, 34 to one another. Moreover, the wiring 50 connects the first and second modules 25, 26 and the electronic devices 31, 32, 33, 34 to one another.

The wiring 50 includes connection wiring that connects the battery modules 20 and the electronic devices to one another. The wiring 50 further includes front-side wiring that is arranged inside the pack case 10, between the front wall 13 and the first and second modules 25, 26. The front-side wiring includes a part that passes through a clearance between a front end of the partition 60 and the front wall 13.

The smoke exhaust duct 80 has split ends on one side. The split ends are respectively connected to the first module 25 and the second module 26. The other end of the smoke exhaust duct 80 is routed out of the pack case 10. The smoke exhaust duct 80 guides a gas discharged from a safety valve (not shown) of the cells 21 of the first module 25 and the second module 26 to an outside of the pack case 10.

Figure 5:
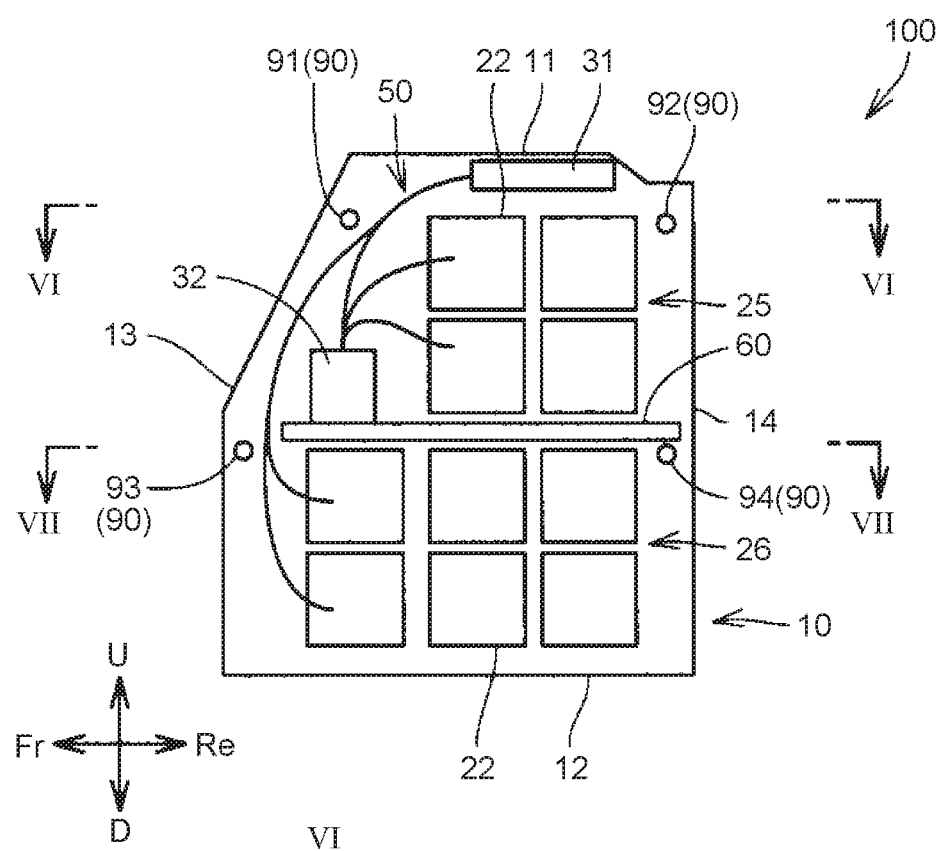
FIG. 5 is a sectional view of the battery pack according to Embodiment 1.
Figure 6:
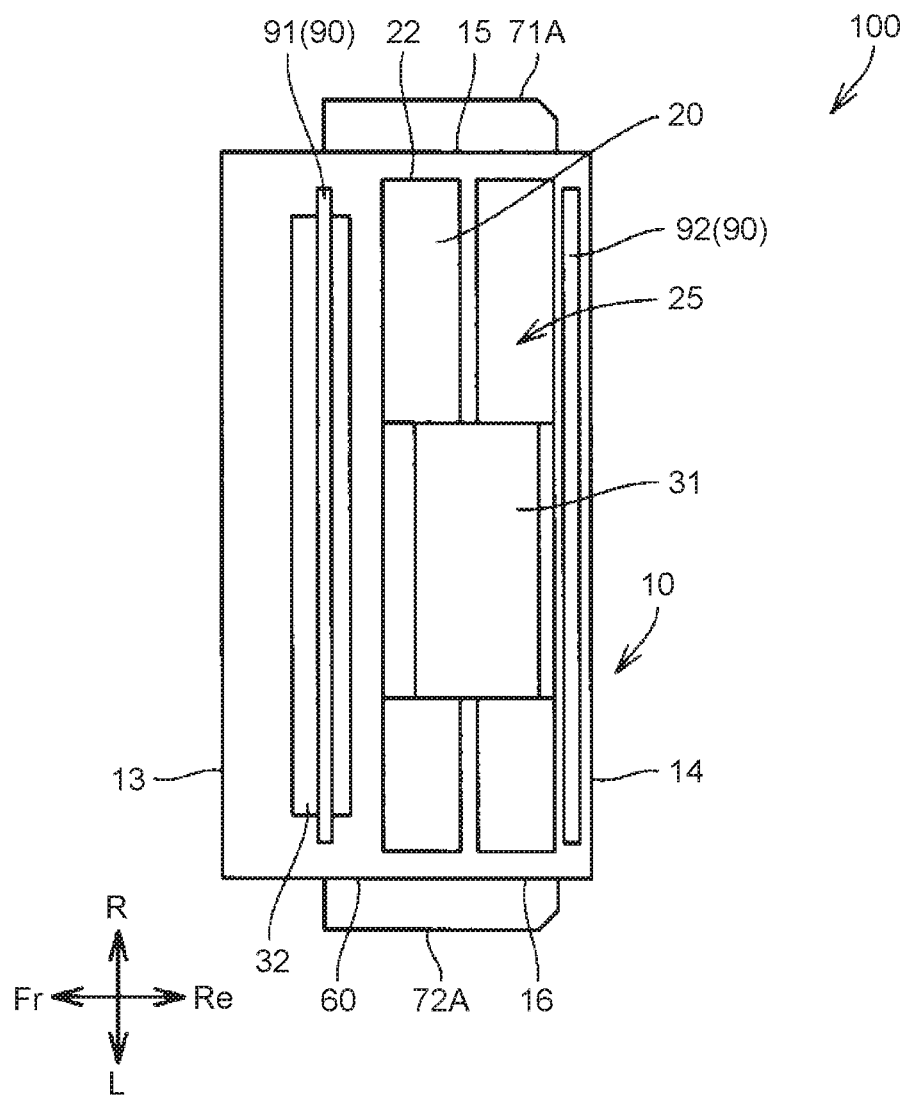
FIG. 6 is a sectional view taken along the line VI-VI indicated in FIG. 5.
Figure 7:
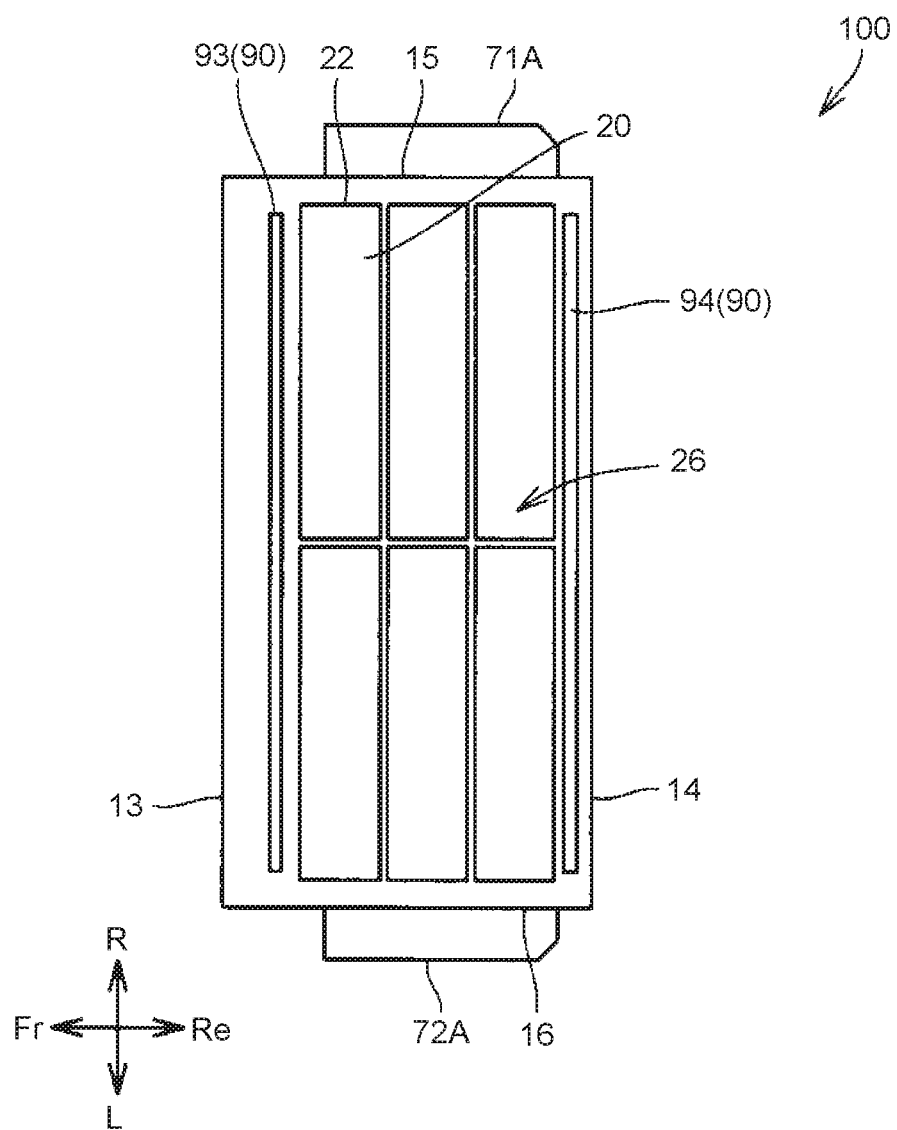
FIG. 7 is a sectional view taken along the line VII-VII indicated in FIG. 5.

FIG. 5 is a sectional view of the battery pack according to Embodiment 1. FIG. 6 is a sectional view taken along the line VI-VI indicated in FIG. 5. FIG. 7 is a sectional view taken along the line VII-VII indicated in FIG. 5. The fire-extinguishing agent releasing unit 90 will be described with reference to FIG. 5 and FIG. 6.

The fire-extinguishing agent releasing unit 90 includes a plurality of fire-extinguishing agent-enclosing bodies 91, 92, 93, 94. The fire-extinguishing agent-enclosing bodies 91, 92, 93, 94 each have a fire-extinguishing agent and a sealed part packed with this fire-extinguishing agent.

For example, bicarbonate, phosphate, or the like in powder form is used as the fire-extinguishing agent. An agent that reduces the concentration of oxygen inside the pack case 10 by an inert gas, such as carbon dioxide or nitrogen, or an agent that has an inhibitive effect on combustion reactions of halides etc. can be used as the fire-extinguishing agent. Alternatively, an agent that cools a heat source by a liquid coolant, such as water, can be used as the fire-extinguishing agent. Moreover, an agent that is a mixture of sodium hydrogen carbonate, aluminum nitrate, etc. and covers a heat source with nonflammable foam resulting from reactions of the mixture can also be used as the fire-extinguishing agent.

Thus, the fire-extinguishing agent is not limited to powder form, but an agent in the form of gas, liquid, or foam can also be adopted.

The sealed part has an elongated shape and extends along the left-right direction of the vehicle 1. The sealed part has a shape of a tube of which both ends in an extension direction are sealed. For example, the sealed part is formed by a resin member. The sealed part is formed so as to melt when heated to a predetermined temperature or higher. As the sealed part melts, the fire-extinguishing agent packed inside the sealed part is released to an outside of the sealed part.

Each of the fire-extinguishing agent-enclosing bodies 91, 92, 93, 94 are all disposed between the battery module 20 and the pack case 10.

The fire-extinguishing agent-enclosing body 91 is disposed so as to be able to release the fire-extinguishing agent toward the wiring 50 that is arranged between the module case 22 and the pack case 10. The fire-extinguishing agent-enclosing body 91 is disposed above the front-side wiring that is arranged between the front wall 13 and the battery module 20. Specifically, the fire-extinguishing agent-enclosing body 91 is disposed above the front-side wiring that is arranged between the front wall 13 and the first and second modules 25, 26. The fire-extinguishing agent-enclosing body 91 is disposed on the front side of the first module 25, at a position closer to the front wall 13.

At the installation position of the fire-extinguishing agent-enclosing body 91 in the front-rear direction of the vehicle, the fire-extinguishing agent-enclosing body 91 is preferably located above the entire front-side wiring. In other words, in an imaginary plane that passes through a central axis of the fire-extinguishing agent-enclosing body 91 and is parallel to the up-down direction, the fire-extinguishing agent-enclosing body 91 is preferably located above the entire front-side wiring.

The fire-extinguishing agent-enclosing body 92 is disposed between the first module 25 and the rear wall 14. The fire-extinguishing agent-enclosing body 92 is disposed between the rear wall 14 and an upper end of the first module 25 on a rear end side.

The fire-extinguishing agent-enclosing body 93 is disposed between the second module 26 and the front wall 13. The fire-extinguishing agent-enclosing body 93 is disposed farther on the front side than the front end of the partition 60. When the fire-extinguishing agent-enclosing body 93 is disposed farther on the front side than the front end of the partition 60, the position of the fire-extinguishing agent-enclosing body 93 is not limited to a position between the second module 26 and the front wall 13 but may be a position above the clearance between the front wall 13 and the front end of the partition 60.

The fire-extinguishing agent-enclosing body 94 is disposed between the second module 26 and the rear wall 14. The fire-extinguishing agent-enclosing body 94 is disposed under the partition 60. The fire-extinguishing agent-enclosing body 94 is disposed between the rear wall 14 and an upper end of the second module 26 on a rear end side.

If the vehicle 1 is hit, an impact is exerted on the battery pack 100, causing the battery module 20 housed inside the pack case 10 of the battery pack 100 to move toward the opposite side from the hit side. As a result, internal components disposed between the module case 22 and the pack case 10, such as the electronic devices 31, 32, 33, 34 and the wiring 50 arranged inside the pack case 10, may be damaged by the impact force and generate heat inside the pack case 10.

As described above, the fire-extinguishing agent releasing unit 90 is configured to include the parts that are disposed between the battery module 20 and the pack case 10, and to release the fire-extinguishing agent between the pack case 10 and the module case 22 as the sealed parts are heated and melted inside the pack case 10. Thus, when heat is generated inside the pack case, the fire-extinguishing agent can be quickly released between the pack case 10 and the module case 22, without the need to wait for the arrival of a worker who supplies a fire-extinguishing agent from outside.

Since the battery assembly is housed inside the module case 22, even when the fire-extinguishing agent is released due to accidental activation of the fire-extinguishing agent releasing unit 90, this fire-extinguishing agent is not directly supplied to the battery assembly. Thus, it is possible to avoid a situation in which the fire-extinguishing agent released due to accidental activation of the fire-extinguishing agent releasing unit causes short-circuit of the battery assembly disposed inside the module case.

As has been described above, the battery pack 100 according to Embodiment 1 allows quick release of the fire-extinguishing agent inside the pack case while avoiding short-circuit of the battery assembly disposed inside the module case due to accidental activation of the fire-extinguishing agent releasing unit.

If the vehicle 1 is hit and the wiring 50 breaks, heat is generated from the break in the wiring 50, and the generated heat is conducted through the wiring toward the battery module.

In such cases, the fire-extinguishing agent is released toward the wiring 50 as the sealed parts of the fire-extinguishing agent releasing unit 90 are melted by being heated to a predetermined temperature or higher under the heat generated from the breakage in the wiring. Thus, it is possible to release the fire-extinguishing agent specifically toward the heat generation point and the heat conduction path so as to suppress the temperature rise of the heat generation point and the heat conduction path. Moreover, compared with immersing the inside of the pack case in the fire-extinguishing agent, releasing the fire-extinguishing agent specifically toward the heat generation point and the heat conduction path can reduce the amount of fire-extinguishing agent to be released.

In particular, if the vehicle 1 is hit from behind, an impact is exerted on the battery pack 100 from the rear side. In this case, the rear wall 14 is pushed toward the front side, so that the partition 60 is pushed toward the front side, or the first module 25 and the second module 26 are pushed toward the front side.

When the first module 25 and the second module 26 move toward the front side, the front-side wiring that is arranged between the front wall 13 and the first and second modules 25, 26 inside the pack case 10 is likely to get caught and broken between the pack case 10 and the first and second modules 25, 26.

When the fire-extinguishing agent-enclosing body 91 is disposed above the front-side wiring as described above, in the event of breakage of the front-side wiring, the fire-extinguishing agent is released from the fire-extinguishing agent-enclosing body 91 toward the front-side wiring that constitutes a heat generation source as well as heat conduction path. Thus, when the fire-extinguishing agent releasing unit 90 is configured to include the part that is disposed above the point at which the wiring is prone to breakage, the battery pack can reduce the consumption of the fire-extinguishing agent and yet can suppress the temperature rise of the heat generation point and the heat conduction path more advantageously.

Here, the partition 60 is likely to be pushed along with the rear wall 14 and move toward the front side. Accordingly, when the front-side wiring includes a part that passes through the front end of the partition 60 and the front wall 13, this part is likely to get caught and broken between the front end of the partition 60 and the front wall 13 as a result of a rear-end collision. Therefore, when the front-side wiring includes a part that passes through the clearance between the front end of the partition 60 and the front wall 13, disposing the fire-extinguishing agent-enclosing body 91 above the front-side wiring can enhance the above advantages.

As the fire-extinguishing agent-enclosing body 93 is disposed farther on the front side than the front end of the partition 60, in the vicinity of the clearance between the front end of the partition 60 and the front wall 13, the fire-extinguishing agent can be released also from the fire-extinguishing agent-enclosing body 93 to the front-side wiring that constitutes a heat conduction path. Thus, the above advantages can be further enhanced.

As the fire-extinguishing agent-enclosing body 92 and the fire-extinguishing agent-enclosing body 94 are disposed on the rear side inside the pack case 10, the fire-extinguishing agent can be released specifically toward a heat generation point when heat is generated from the rear side inside the pack case 10.

As has been described above, the battery pack according to Embodiment 1 can reduce the consumption of the fire-extinguishing agent and yet can suppress the temperature rise of the wiring that constitutes a heat conduction path.

Figure 8:
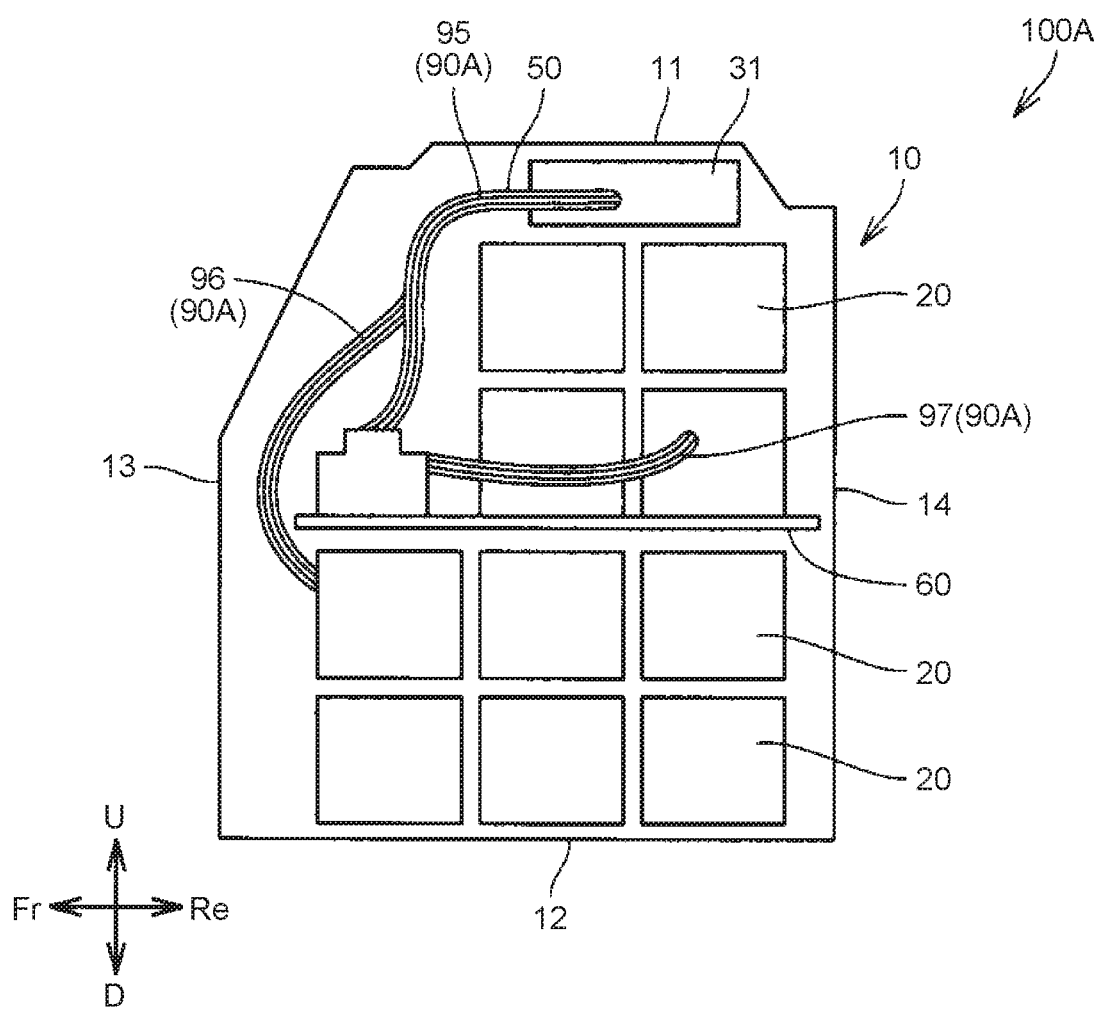
FIG. 8 is a sectional view of a battery pack according to Embodiment 2.
Figure 9:
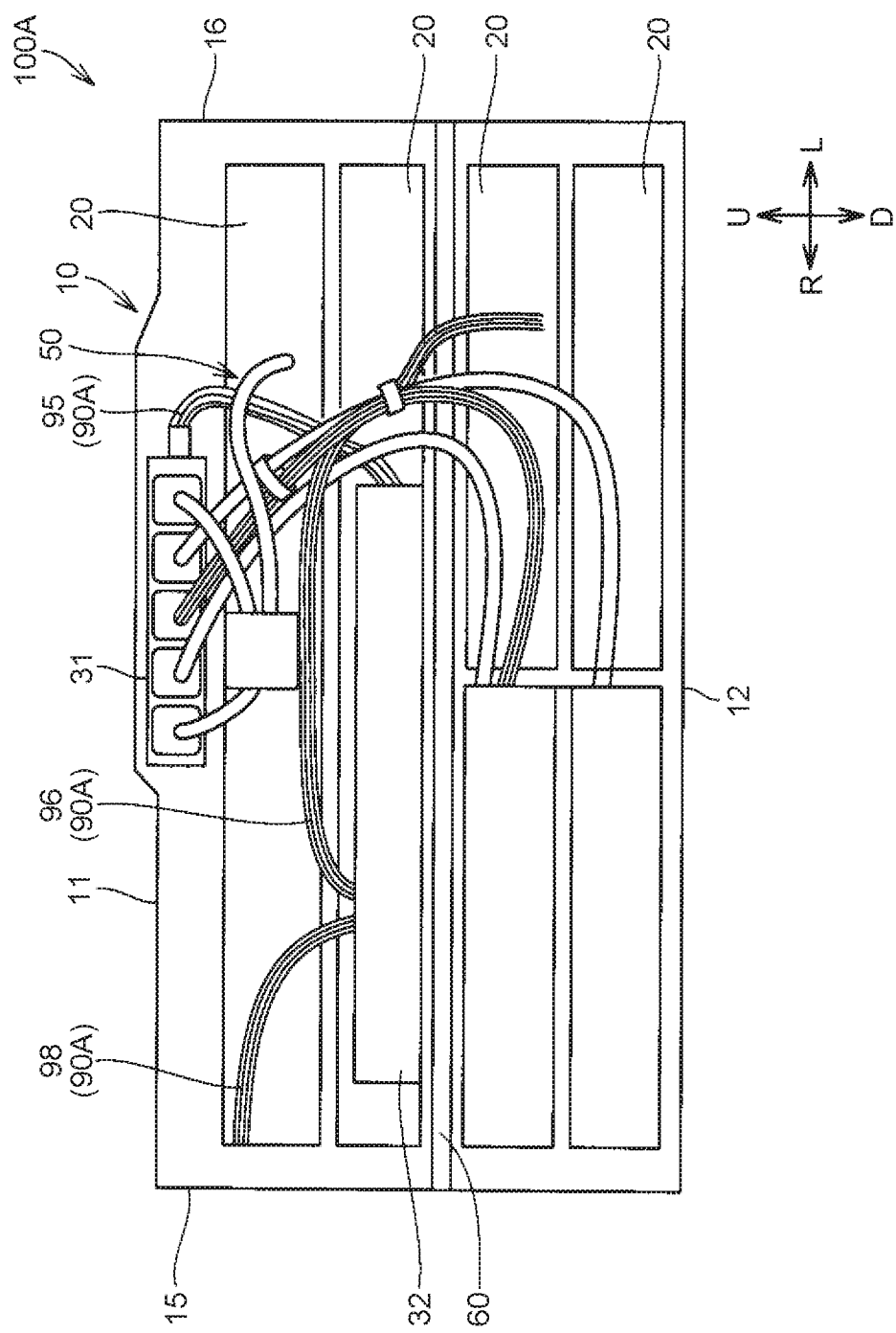
FIG. 9 is a view showing the battery pack according to Embodiment 2, with a front wall removed from a pack case.

FIG. 8 is a sectional view of a battery pack according to Embodiment 2. FIG. 9 is a view showing the battery pack according to Embodiment 2, with the front wall removed from the pack case. A battery pack 100A according to Embodiment 2 will be described with reference to FIG. 8 and FIG. 9.

As shown in FIG. 8 and FIG. 9, the battery pack 100A according to Embodiment 2 is different from the battery pack 100 according to Embodiment 1 in the arrangement of a fire-extinguishing agent releasing unit 90A. The configurations of these embodiments are otherwise almost the same.

As shown in FIG. 8 and FIG. 9, the fire-extinguishing agent releasing unit 90A in Embodiment 2 also includes parts that are disposed between the battery module 20 and the pack case 10, and releases the fire-extinguishing agent between the pack case 10 and the module case 22 as the sealed parts are heated and melted inside the pack case 10.

Specifically, the fire-extinguishing agent releasing unit 90A is configured to include parts that are provided along connection wiring of the wiring 50. For example, the connection wiring connects the battery modules 20 and the electronic devices 31, 32 to one another. The connection wiring may include wires that connect the electronic devices to one another.

The fire-extinguishing agent releasing unit 90A includes a plurality of fire-extinguishing agent-enclosing bodies 95, 96, 97, 98. The fire-extinguishing agent-enclosing bodies 95, 96, 97, 98 are disposed along the connection wiring. The fire-extinguishing agent-enclosing bodies 95, 96, 97, 98 are fixed to the connection wiring with binding bands etc. The fire-extinguishing agent-enclosing bodies 95, 96, 97, 98 each include a part that comes in contact with the connection wiring. The fire-extinguishing agent-enclosing bodies 95, 96, 97, 98 each have a fire-extinguishing agent and a sealed part packed with this fire-extinguishing agent.

A fire-extinguishing agent similar to that of Embodiment 1 is used. The sealed part has an elongated shape. The sealed part has a shape of a tube of which both ends in an extension direction are sealed. For example, the sealed part is formed by a flexible resin member. The sealed part is disposed along the connection wiring. The sealed part is formed so as to melt when heated to a predetermined temperature or higher. As the sealed part melts, the fire-extinguishing agent packed inside the sealed part is released to the outside of the sealed part.

In Embodiment 2, too, when heat is generated inside the pack case as a result of a collision, the fire-extinguishing agent is released between the pack case 10 and the module case 22 as the sealed part of the fire-extinguishing agent releasing unit 90A is melted by being heated to a predetermined temperature or higher. Thus, the fire-extinguishing agent can be quickly released between the pack case 10 and the module case 22, without the need to wait for the arrival of a worker who supplies a fire-extinguishing agent from outside.

Since the battery assembly is housed inside the module case 22, even when the fire-extinguishing agent is released due to accidental activation of the fire-extinguishing agent releasing unit 90A, this fire-extinguishing agent is not directly supplied to the battery assembly. Thus, it is possible to avoid a situation in which the fire-extinguishing agent released due to accidental activation of the fire-extinguishing agent releasing unit 90A causes short-circuit of the battery assembly disposed inside the module case 22.

As has been described above, the battery pack 100A according to Embodiment 2 can offer advantages similar to those of the battery pack 100 according to Embodiment 1.

In particular, when the battery modules 20 move, the connection wiring that connects the battery modules 20 and the electronic devices disposed inside the pack case 10 but outside the module case 22 to one another is likely to break.

When the fire-extinguishing agent-enclosing bodies 95, 96, 97, 98 are disposed along the connection wiring as described above, in the event of breakage of the connection wiring, the fire-extinguishing agent is released from the fire-extinguishing agent-enclosing bodies 95, 96, 97, 98 toward the connection wiring that constitutes a heat generation source as well as heat conduction path. Thus, when the fire-extinguishing agent releasing unit 90A is configured to include the parts provided along the connection wiring that is prone to breakage, the battery pack can reduce the consumption of the fire-extinguishing agent and yet can suppress the temperature rise of the heat generation point and the heat conduction path.

Figure 10:
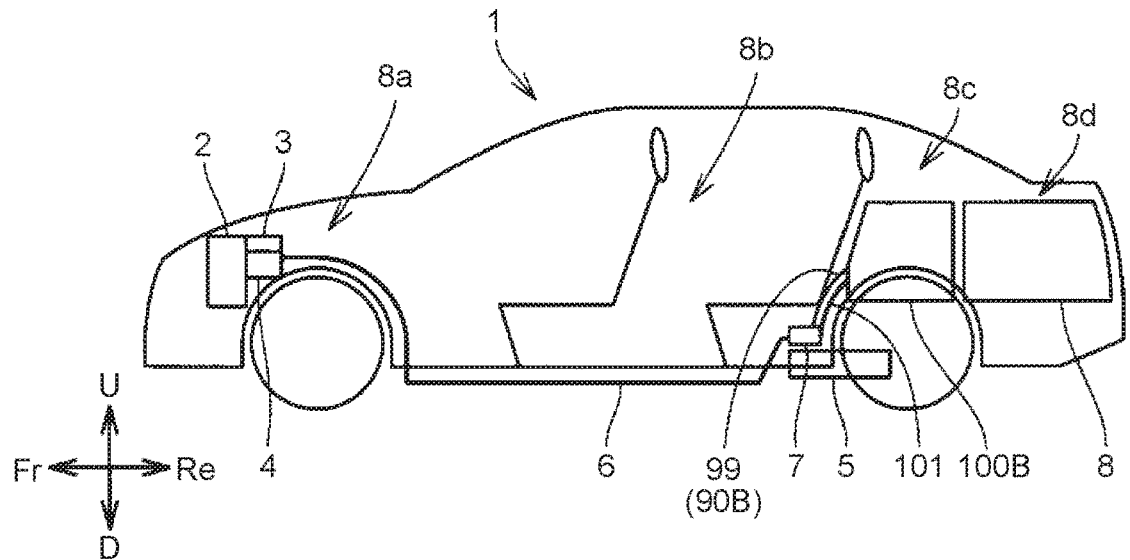
FIG. 10 is a side view of a vehicle equipped with a battery pack according to Embodiment 3.

FIG. 10 is a side view of a vehicle equipped with a battery pack according to Embodiment 3. A battery pack 100B according to Embodiment 3 will be described with reference to FIG. 10.

As shown in FIG. 10, the battery pack 100B according to Embodiment 3 is different from the battery pack 100 according to Embodiment 1 in the configuration of a fire-extinguishing agent releasing unit 90B. The configurations of these embodiments are otherwise almost the same.

The fire-extinguishing agent releasing unit 90B includes, in addition to the fire-extinguishing agent-enclosing bodies 91, 92, 93, 94 of Embodiment 1, a fire-extinguishing agent-enclosing body 99 that is disposed above the wiring 101 (outside wiring) located outside the pack case 10.

The fire-extinguishing agent-enclosing body 99 is disposed outside the pack case 10, above the wiring 101 that is routed out of the pack case 10. The fire-extinguishing agent-enclosing body 99 has almost the same configuration as the fire-extinguishing agent-enclosing bodies 91, 92, 93, 94. The sealed part of the fire-extinguishing agent-enclosing body 99 is formed by a flexible resin member. Thus, the fire-extinguishing agent-enclosing body 99 can be disposed above the wiring 101 along the wiring 101.

If the vehicle 1 is hit, the pack case 10 also moves. As a result, the wiring 101 routed out of the pack case 10 may get caught and broken between the pack case 10 and a member disposed around the pack case 10. In such cases, heat is generated from the break in the wiring 101, and the generated heat is conducted through the wiring 101 toward the battery pack 100.

The fire-extinguishing agent is released toward the wiring 101 as the sealed part of the fire-extinguishing agent-enclosing body 99 is melted by being heated to a predetermined temperature or higher under the heat generated from the break in the wiring. Thus, it is possible to release the fire-extinguishing agent specifically toward the heat generation point and the heat conduction path so as to suppress the temperature rise of the heat generation point and the heat conduction path. As a result, the heat from outside the pack case 10 can be prevented from being conducted through the wiring 101 into the battery pack 100B.

Since the internal configuration of the pack case 10 is the same as in Embodiment 1, the battery pack 100B according to Embodiment 3 can also offer advantages similar to those of the battery pack 100 according to Embodiment 1.

Figure 11:
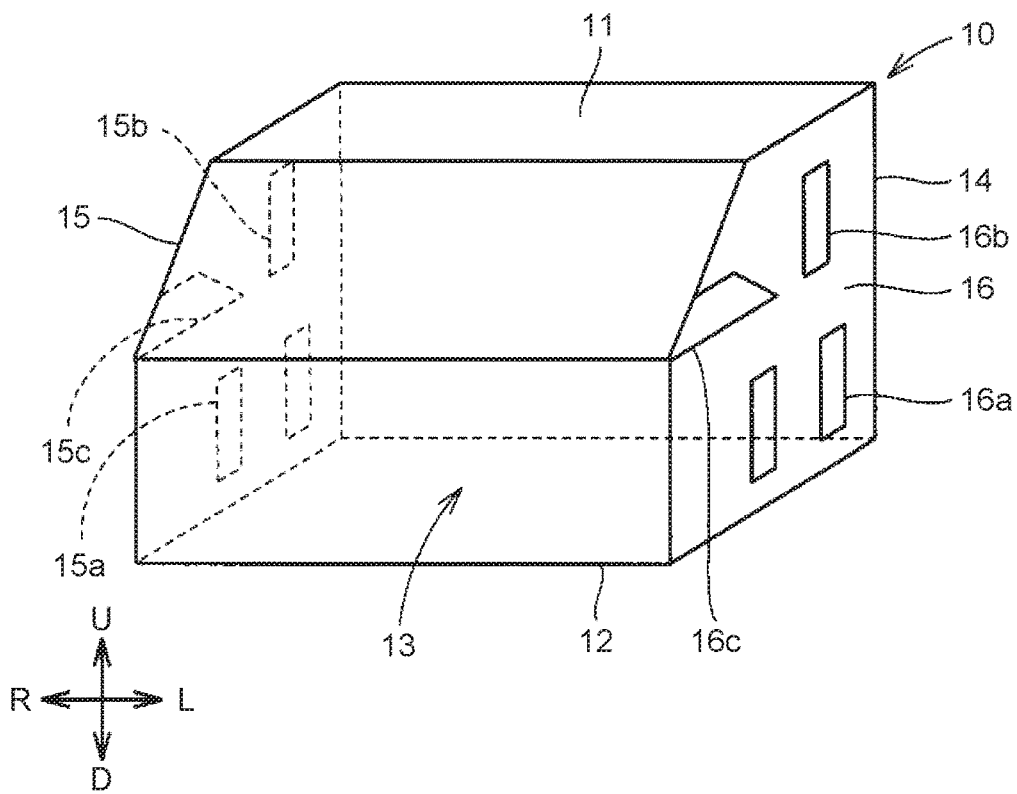
FIG. 11 is a perspective view showing a pack case of a battery pack according to Embodiment 4.
Figure 12:
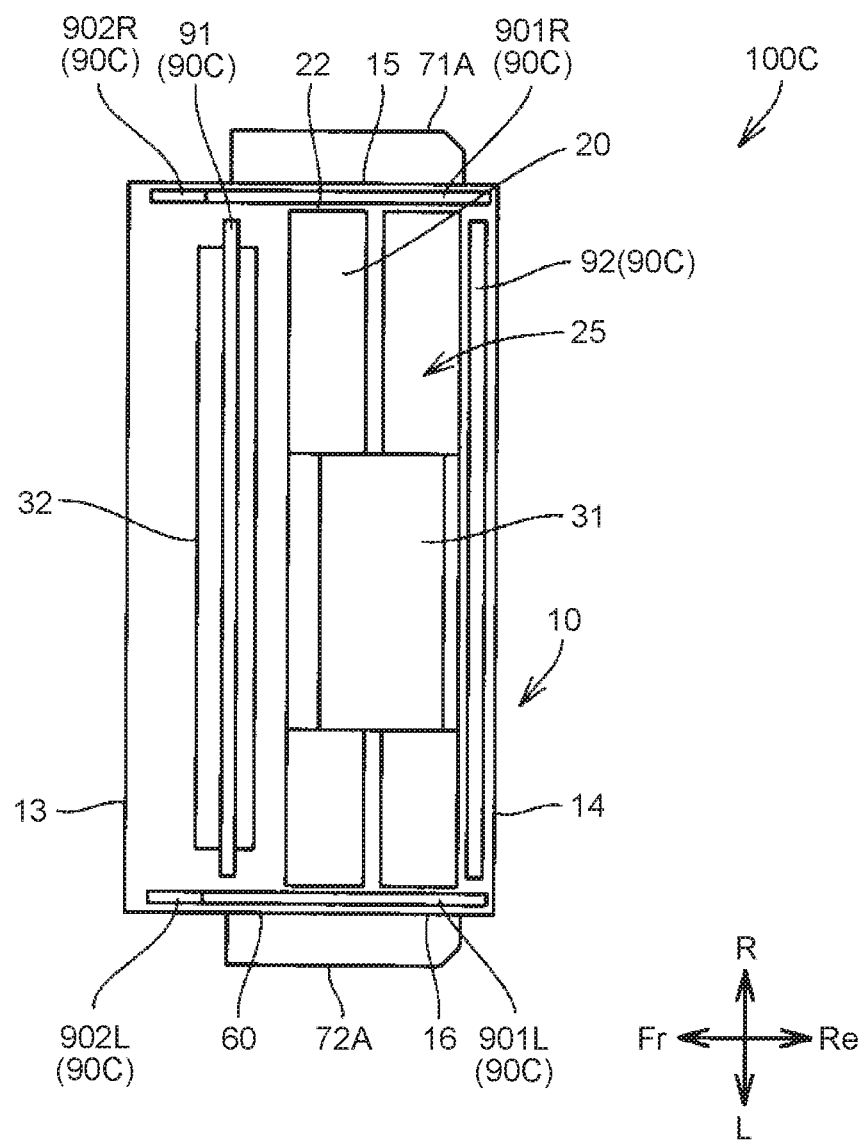
FIG. 12 is a plan view showing parts of a fire-extinguishing agent releasing unit that are disposed on an upper side inside the pack case of the battery pack according to Embodiment 4.
Figure 13:
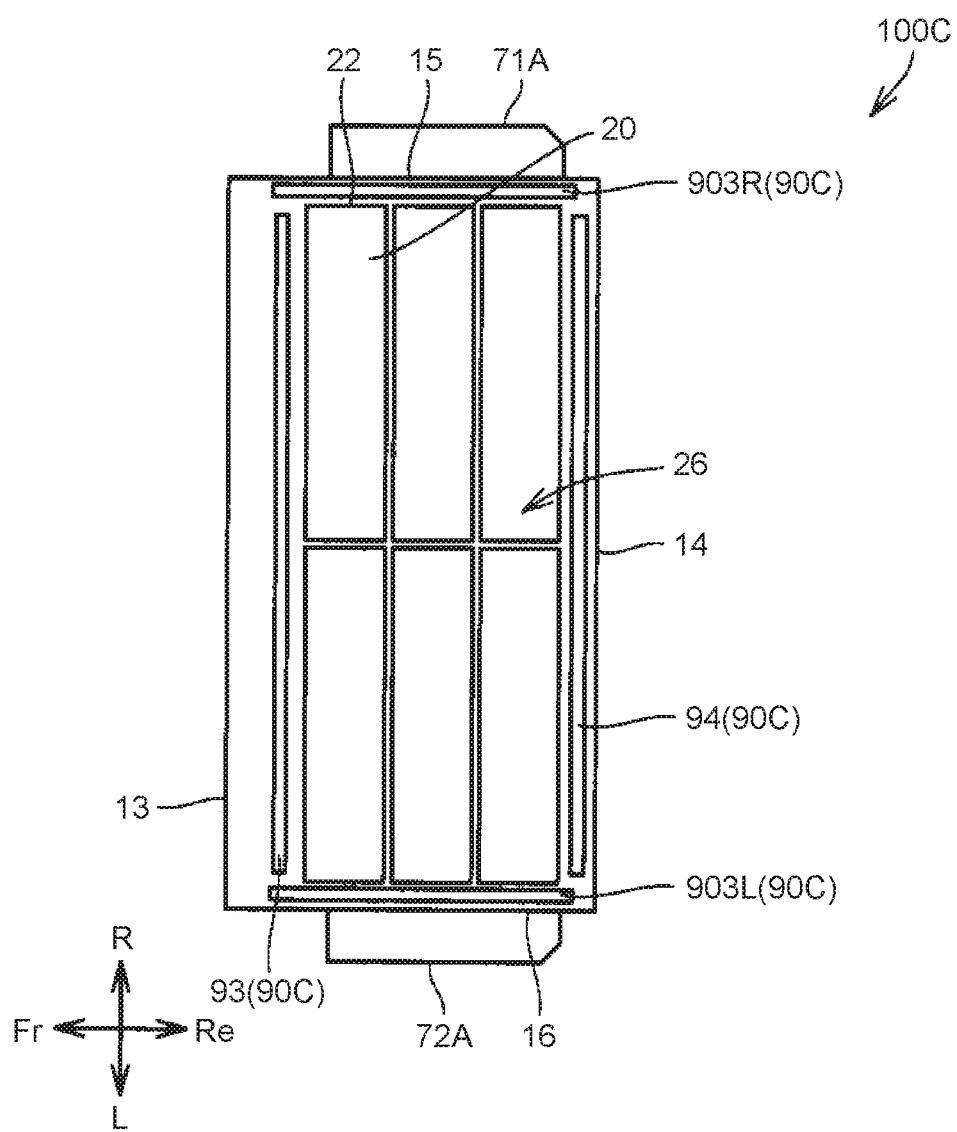
FIG. 13 is a plan view showing parts of the fire-extinguishing agent releasing unit that are disposed at a center part in an up-down direction, inside the pack case of the battery pack according to Embodiment 4.
Figure 14:
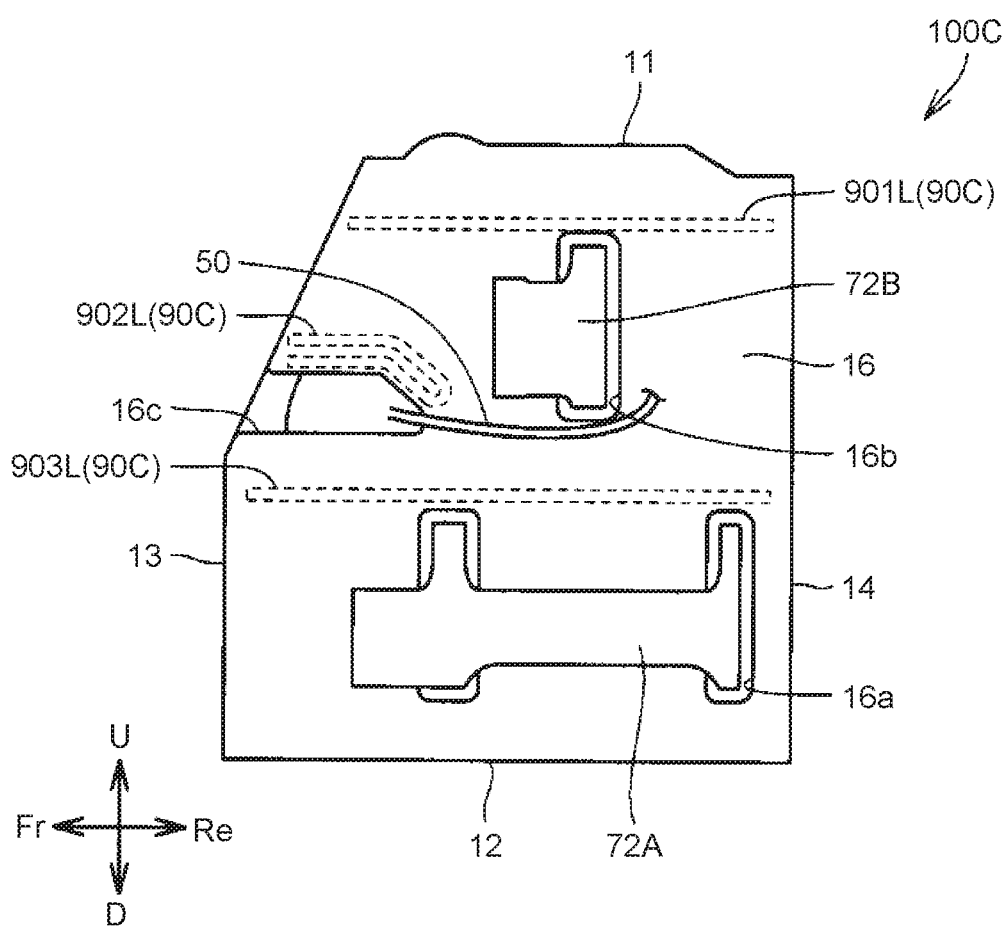
FIG. 14 is a side view of the battery pack according to Embodiment 4.
Figure 15:
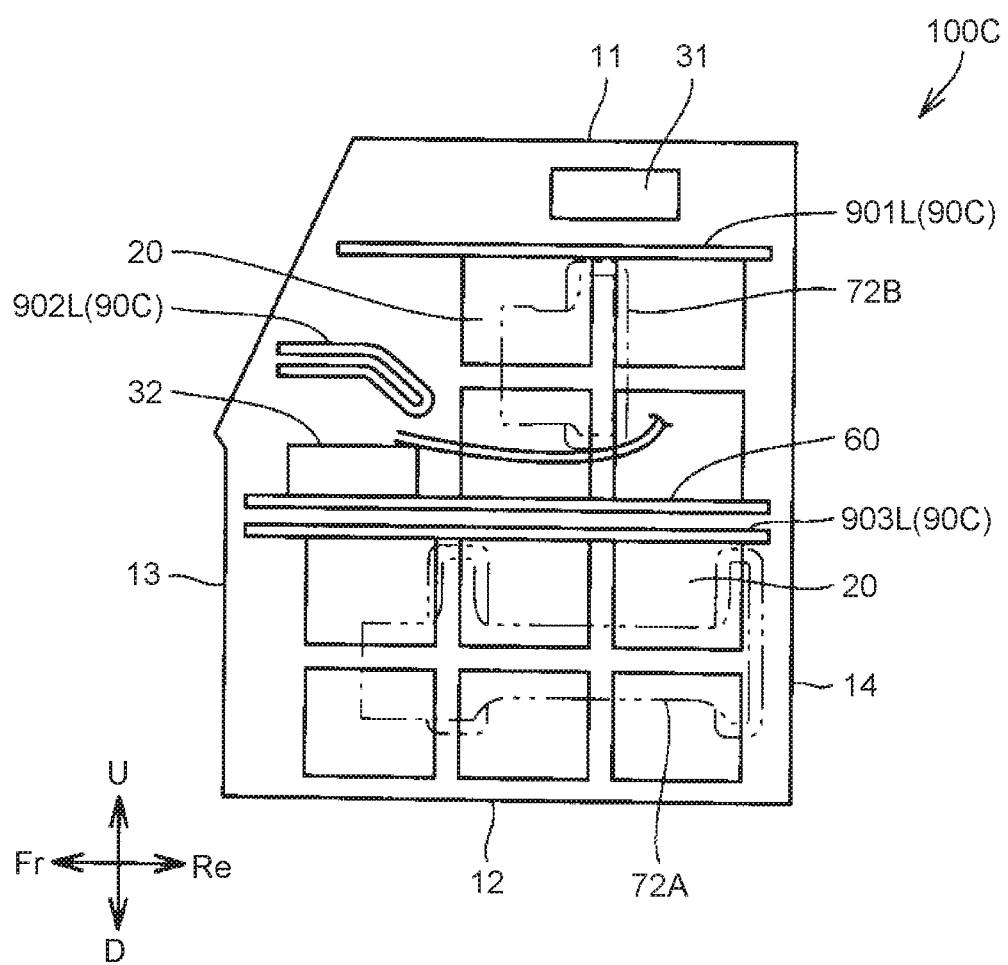
FIG. 15 is a side view of the battery pack according to Embodiment 4, with a side wall of the battery pack removed.

FIG. 11 is a perspective view showing a pack case of a battery pack according to Embodiment 4. FIG. 12 is a plan view showing parts of a fire-extinguishing agent releasing unit that are disposed on an upper side inside the pack case of the battery pack according to Embodiment 4. FIG. 13 is a plan view showing parts of the fire-extinguishing agent releasing unit that are disposed at a center part in the up-down direction, inside the pack case of the battery pack according to Embodiment 4. FIG. 14 is a side view of the battery pack according to Embodiment 4. FIG. 15 is a side view of the battery pack according to Embodiment 4, with the side wall removed. A battery pack 100C according to Embodiment 4 will be described with reference to FIG. 11 to FIG. 15.

FIG. 12 is a plan view in a position corresponding to FIG. 6 of Embodiment 1, and FIG. 13 is a plan view in a position corresponding to FIG. 7 of Embodiment 1.

As shown in FIG. 11 to FIG. 15, the battery pack 100C according to Embodiment 4 is different from the battery pack 100 according to Embodiment 1 in that the openings formed in the pack case 10 are left open to the outside, and in the configuration of a fire-extinguishing agent releasing unit 90C. The configurations of these embodiments are otherwise almost the same.

As shown in FIG. 11, the side wall 15 of the pack case 10 has a plate-like shape. The side wall 15 is fixed to the right-side end of the upper frame 41 and the right-side end of the lower frame 42. The side wall 15 has openings 15a, 15b, 15c.

The openings 15a are provided at a lower part of the side wall 15. The opening 15b is provided at an upper part of the side wall 15. The opening 15c is provided on the front side of the side wall 15, at a center part in the up-down direction.

The air intake duct 71A is routed out through the openings 15a. There is a clearance between each opening 15a and a circumferential surface of a part of the air intake duct 71A that is passed through the opening 15a, and the openings 15a are left open to the outside.

The air exhaust duct 71B is routed out through the opening 15b. There is a clearance between the opening 15b and a circumferential surface of a part of the air exhaust duct 71B that is passed through the opening 15b, and the opening 15b is left open to the outside.

A part of the wiring 50 is routed out through the opening 15c. There is a clearance between the opening 15c and a circumferential surface of a part of the wiring 50 that is passed through the opening 15c, and the opening 15c is left open to the outside.

The side wall 16 has a plate-like shape. The side wall 16 is fixed to the left-side end of the upper frame 41 and the left-side end of the lower frame 42. The side wall 16 has openings 16a, 16b, 16c. The openings 16a are provided at a lower part of the side wall 16. The opening 16b is provided at an upper part of the side wall 16. The opening 16c is provided on the front side of the side wall 16, at a center part in the up-down direction.

The air intake duct 72A is routed out through the openings 16a. There is a clearance between each opening 16a and a circumferential surface of a part of the air intake duct 72A that is passes through the opening 16a, and the openings 16a are left open to the outside.

The air exhaust duct 72B is routed out through the opening 16b. There is a clearance between the opening 16b and a circumferential surface of a part of the air exhaust duct 72B that is passed through the opening 16b, and the opening 16b is left open to the outside.

A part of the wiring 50 is routed out through the opening 16c. There is a clearance between the opening 16c and a circumferential surface of a part of the wiring 50 that is passed through the opening 16c, and the opening 16c is left open to the outside.

The fire-extinguishing agent releasing unit 90C in Embodiment 4 also includes parts that are disposed between the battery module 20 and the pack case 10, and releases the fire-extinguishing agent between the pack case 10 and the module case 22 as the sealed parts are heated and melted inside the pack case 10.

As shown in FIG. 12 and FIG. 13, the fire-extinguishing agent releasing unit 90C includes a plurality of fire-extinguishing agent-enclosing bodies 91, 92, 93, 94, 901L, 901R, 902L, 902R, 903L, 903R. The fire-extinguishing agent-enclosing bodies 91, 92, 93, 94, 901L, 901R, 902L, 902R, 903L, 903R each have the fire-extinguishing agent and the sealed part packed with this fire-extinguishing agent as in Embodiment 1.

The fire-extinguishing agent-enclosing bodies 91, 92, 93, 94, 901L, 901R, 902L, 902R, 903L, 903R are all disposed between the battery module 20 and the pack case 10.

The fire-extinguishing agent-enclosing bodies 91, 92, 93, 94 are disposed at almost the same positions as in Embodiment 1.

As shown in FIG. 12 to FIG. 15, the fire-extinguishing agent-enclosing body 901L extends along the front-rear direction of the vehicle 1. The fire-extinguishing agent-enclosing body 901L is disposed between the first module 25 and the side wall 16. The fire-extinguishing agent-enclosing body 901L is disposed on the inner side of the side wall 16, above the opening 16b formed in the side wall 16.

When seen from the left-right direction, the fire-extinguishing agent-enclosing body 902L is located on the front side of the first module 25, above the electronic device 32. The fire-extinguishing agent-enclosing body 902L is located on the inner side of the side wall 16, above the opening 16c formed in the side wall 16. The fire-extinguishing agent-enclosing body 902L includes a part that extends along a wall surface of the side wall 16 that defines an upper edge of the opening 16c.

The fire-extinguishing agent-enclosing body 903L extends along the front-rear direction of the vehicle 1. The fire-extinguishing agent-enclosing body 903L is disposed between the second module 26 and the side wall 16. The fire-extinguishing agent-enclosing body 903L is located on the inner side of the side wall 16, above the opening 16a formed in the side wall 16.

The positions of the fire-extinguishing agent-enclosing bodies 901R, 902R, 903R relative to the side wall 15 and the openings 15a, 15b, 15c are almost the same as the positions of the fire-extinguishing agent-enclosing bodies 901L, 902L, 903L relative to the side wall 16 and the openings 16a, 16b, 16c. The fire-extinguishing agent-enclosing bodies 901R, 902R, 903R are similar in shape to the fire-extinguishing agent-enclosing bodies 901L, 902L, 903L, respectively.

The fire-extinguishing agent-enclosing body 901R extends along the front-rear direction of the vehicle 1. The fire-extinguishing agent-enclosing body 901R is disposed between the first module 25 and the side wall 15. The fire-extinguishing agent-enclosing body 901R is located on the inner side of the side wall 15, above the opening 15b formed in the side wall 15.

When seen from the left-right direction, the fire-extinguishing agent-enclosing body 902R is located on the front side of the first module 25, above the electronic device 32. The fire-extinguishing agent-enclosing body 902R is located on the inner side of the side wall 15, above the opening 15c formed in the side wall 15. The fire-extinguishing agent-enclosing body 902R includes a part that extends along a wall surface of the side wall 15 that defines an upper edge of the opening 15c.

The fire-extinguishing agent-enclosing body 903R extends along the front-rear direction of the vehicle 1. The fire-extinguishing agent-enclosing body 903R is disposed between the second module 26 and the side wall 15. The fire-extinguishing agent-enclosing body 903R is located on the inner side of the side wall 15, above the opening 15a formed in the side wall 15.

If the vehicle 1 is hit, the wiring 50 that is arranged between the battery module 20 and the pack case 10 may get caught and broken between the battery module 20 and the pack case 10, or the electronic device 32 etc. may be damaged. In such cases, heat is generated from the break in the wiring 50 or the damaged part in the electronic device 32.

When the openings 15a, 15b, 15c and the openings 16a, 16b, 16c formed in the peripheral wall of the pack case 10 are left open to the outside, the heat generated inside the pack case can be conducted through the openings 15a, 15b, 15c and the openings 16a, 16b, 16c to an inflammable member etc. disposed around the battery pack 100.

Here, in the battery pack according to Embodiment 4, as described above, the fire-extinguishing agent releasing unit 90C is configured to include the parts that are located on the inner side of the peripheral wall of the pack case 10, respectively above the openings 15a, 15b, 15c and the openings 16a, 16b, 16c. Thus, the fire-extinguishing agent can be released toward the heat generation point located on the inner side of the walls in which the openings 15a, 15b, 15c and the openings 16a, 16b, 16c are formed, and toward the vicinity of these openings, before the heat generated inside the pack case 10 passes through the openings 15a, 15b, 15c and the openings 16a, 16b, 16c. Thus, it is possible to prevent the heat from being released to the outside through the openings 15a, 15b, 15c and the openings 16a, 16b, 16c provided in the pack case 10.

The fire-extinguishing agent releasing unit 90C of the battery pack 100C according to Embodiment 4 also includes the parts that are disposed between the battery module 20 and the pack case 10, and releases the fire-extinguishing agent between the pack case 10 and the module case 22 as the sealed parts are heated and melted inside the pack case 10. Thus, Embodiment 4 can offer advantages similar to those of Embodiment 1.

Figure 16:
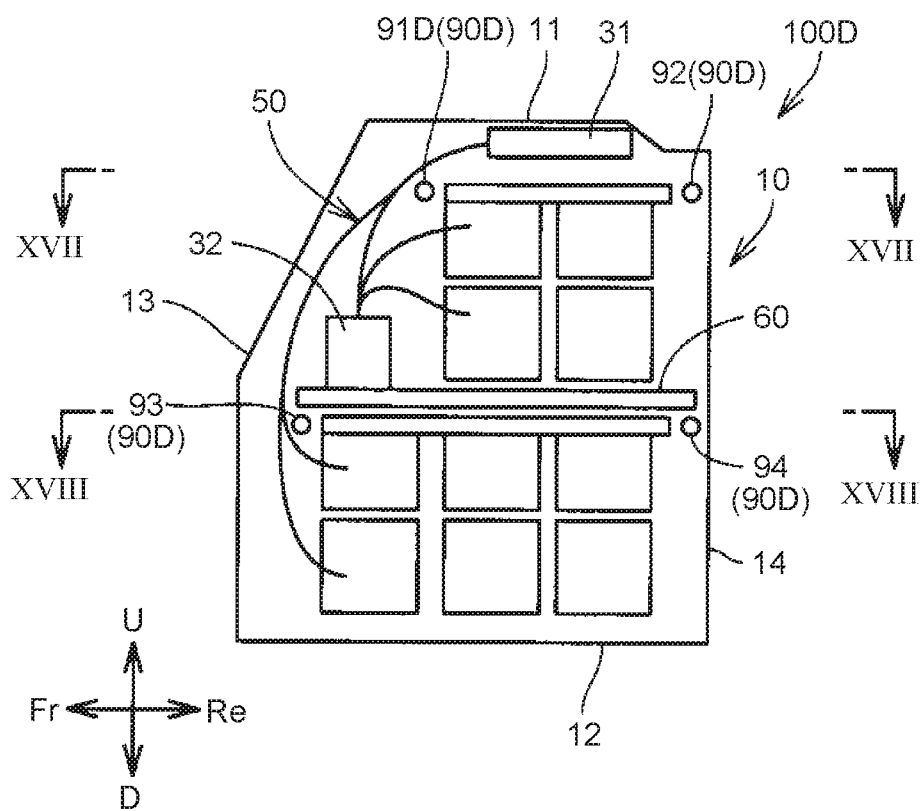
FIG. 16 is a sectional view of a battery pack according to Embodiment 5.
Figure 17:
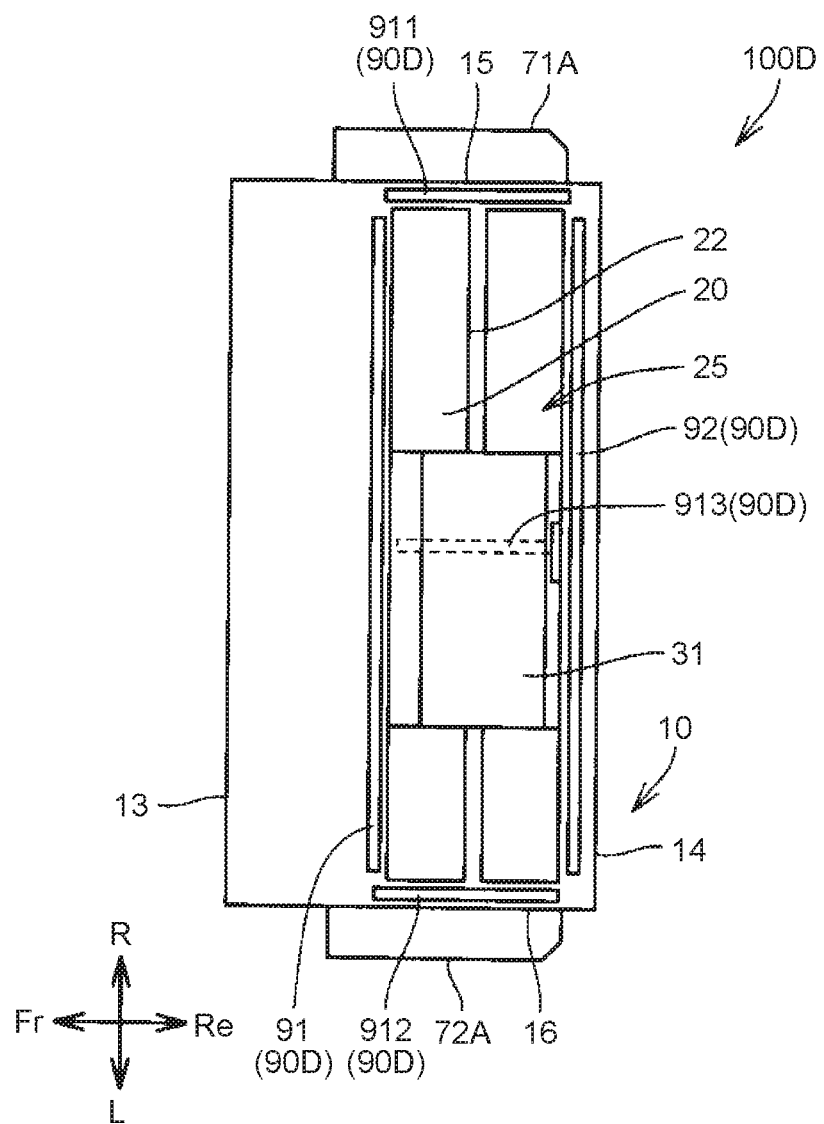
FIG. 17 is a sectional view taken along the line XVII-XVII indicated in FIG. 16.
Figure 18:
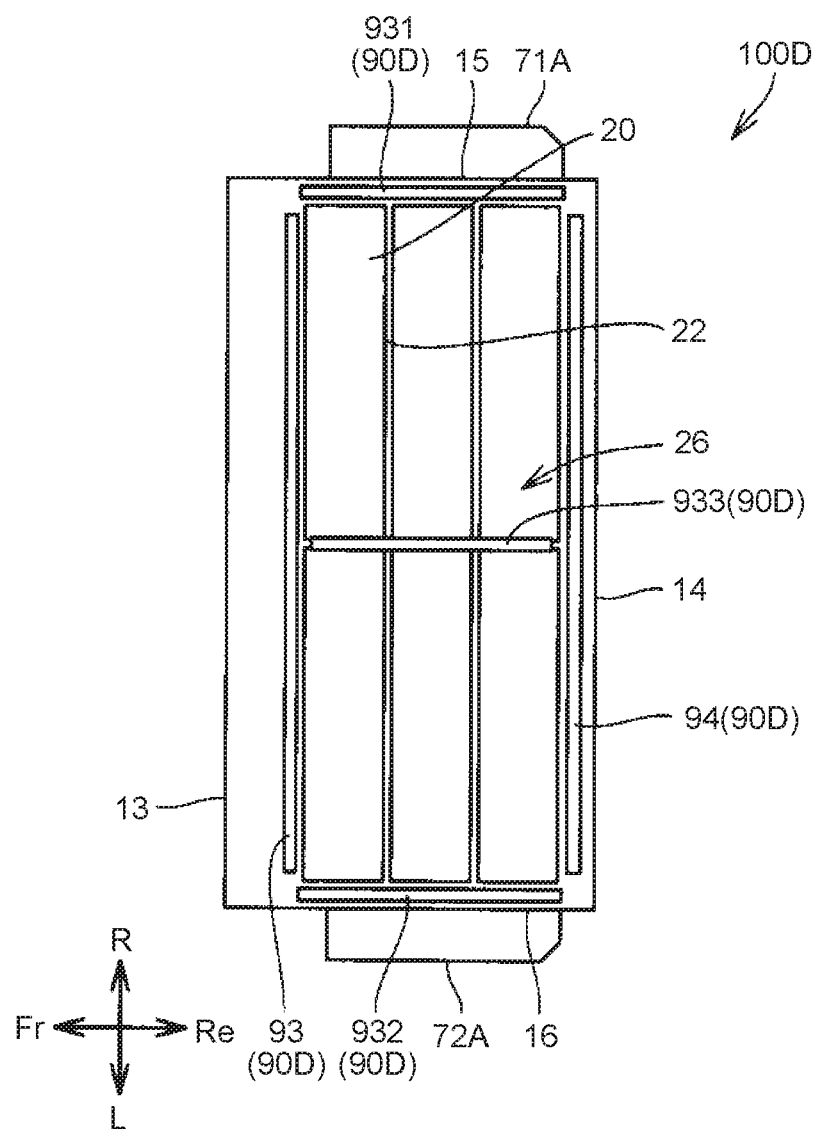
FIG. 18 is a sectional view taken along the line XVIII-XVIII indicated in FIG. 16.

FIG. 16 is a sectional view of a battery pack according to Embodiment 5. FIG. 17 is a sectional view taken along the line XVII-XVII indicated in FIG. 16. FIG. 18 is a sectional view taken along the line XVIII-XVIII indicated in FIG. 16. A battery pack 100D according to Embodiment 5 will be described with reference to FIG. 16 to FIG. 18.

As shown in FIG. 16 to FIG. 18, the battery pack 100D according to Embodiment 5 is different from the battery pack 100 according to Embodiment 1 in the configuration of a fire-extinguishing agent releasing unit 90D. The configurations of these embodiments are otherwise almost the same.

The fire-extinguishing agent releasing unit 90D includes a plurality of fire-extinguishing agent-enclosing bodies 91D, 92, 93, 94, 911, 912, 913, 931, 932, 933. The fire-extinguishing agent-enclosing bodies 91D, 92, 93, 94, 911, 912, 913, 931, 932, 933 each have the fire-extinguishing agent and the sealed part packed with this fire-extinguishing agent as in Embodiment 1.

The fire-extinguishing agent-enclosing bodies 91D, 92, 93, 94 extend along the left-right direction of the vehicle 1. The fire-extinguishing agent-enclosing bodies 911, 912, 913, 931, 932, 933 extend along the front-rear direction of the vehicle 1.

The fire-extinguishing agent-enclosing body 91D is disposed between the module case 22 and the pack case 10. The fire-extinguishing agent-enclosing body 91D is disposed on the front side of the first module 25, closer to the first module 25. The fire-extinguishing agent-enclosing body 91D is disposed so as to face an upper part of a front surface of the first module 25.

The fire-extinguishing agent-enclosing bodies 92, 93, 94 are disposed at almost the same positions as in Embodiment 1.

The fire-extinguishing agent-enclosing body 911 is disposed between the module case 22 and the pack case 10. The fire-extinguishing agent-enclosing body 911 is disposed between the first module 25 and the side wall 15. The fire-extinguishing agent-enclosing body 911 is disposed so as to face an upper part of a right side surface of the first module 25.

The fire-extinguishing agent-enclosing body 912 is disposed between the module case 22 and the pack case 10. The fire-extinguishing agent-enclosing body 912 is disposed between the first module 25 and the side wall 16. The fire-extinguishing agent-enclosing body 912 is disposed so as to face an upper part of a left side surface of the first module 25.

The fire-extinguishing agent-enclosing body 913 is disposed between the fire-extinguishing agent-enclosing body 911 and the fire-extinguishing agent-enclosing body 912 in the left-right direction of the vehicle 1. The fire-extinguishing agent-enclosing body 913 is disposed between the two battery module groups constituting the first module 25.

The fire-extinguishing agent-enclosing body 931 is disposed between the module case 22 and the pack case 10. The fire-extinguishing agent-enclosing body 931 is disposed between the second module 26 and the side wall 15. The fire-extinguishing agent-enclosing body 931 is disposed so as to face an upper part of a right side surface of the second module 26. The fire-extinguishing agent-enclosing body 931 is located below the fire-extinguishing agent-enclosing body 911.

The fire-extinguishing agent-enclosing body 932 is disposed between the module case 22 and the pack case 10. The fire-extinguishing agent-enclosing body 932 is disposed between the second module 26 and the side wall 15. The fire-extinguishing agent-enclosing body 932 is disposed so as to face an upper part of a left side surface of the second module 26. The fire-extinguishing agent-enclosing body 932 is located below the fire-extinguishing agent-enclosing body 912.

The fire-extinguishing agent-enclosing body 933 is disposed between the fire-extinguishing agent-enclosing body 931 and the fire-extinguishing agent-enclosing body 932 in the left-right direction of the vehicle 1. The fire-extinguishing agent-enclosing body 933 is disposed between the two battery module groups constituting the second module 26.

When seen from above, the fire-extinguishing agent-enclosing bodies 91D, 92, 911, 912 are disposed so as to surround the first module 25. Similarly, when seen from above, the fire-extinguishing agent-enclosing bodies 93, 94, 931, 932 are disposed so as to surround the second module 26.

When the fire-extinguishing agent-enclosing bodies 91D, 92, 911, 912 and the fire-extinguishing agent-enclosing bodies 93, 94, 931, 932 are thus disposed, from whichever side of the four sides surrounding the first module 25 and the second module 26 heat may be generated inside the pack case 10, the fire-extinguishing agent can be quickly released toward the heat generation point.

As the fire-extinguishing agent-enclosing bodies 91D, 92, 911, 912 are disposed in the vicinity of the first module 25, when the fire-extinguishing agent is released from these fire-extinguishing agent-enclosing bodies, the fire-extinguishing agent is released not only to the heat generation point but also to the first module 25. Thus, the temperature rise of the first module 25 can be suppressed.

Similarly, the fire-extinguishing agent-enclosing bodies 93, 94, 931, 932 are disposed in the vicinity of the second module 26. Thus, when the fire-extinguishing agent is released from these fire-extinguishing agent-enclosing bodies, the fire-extinguishing agent is released not only to the heat generation point but also to the second module 26. Thus, the temperature rise of the second module 26 can be suppressed.

Moreover, the fire-extinguishing agent-enclosing body 913 is disposed between the two battery module groups. The wiring 50 is also arranged between the two battery module groups. When the fire-extinguishing agent-enclosing body 913 is thus disposed, the fire-extinguishing agent can be released toward the wiring that is arranged between the two battery module groups. As a result, it is possible to prevent heat from being conducted to the first module 25 through the wiring arranged between the two battery module groups.

Similarly, the fire-extinguishing agent-enclosing body 933 is disposed between the two battery module groups. The wiring 50 is also arranged between the two battery module groups. When the fire-extinguishing agent-enclosing body 933 is thus disposed, the fire-extinguishing agent can be released toward the wiring arranged between the two battery module groups. As a result, it is possible to prevent heat from being conducted to the second module 26 through the wiring arranged between the two battery module groups.

As has been described above, the battery pack 100D according to Embodiment 5 can offer advantages similar to or greater than those of the battery pack 100 according to Embodiment 1.

Figure 19:
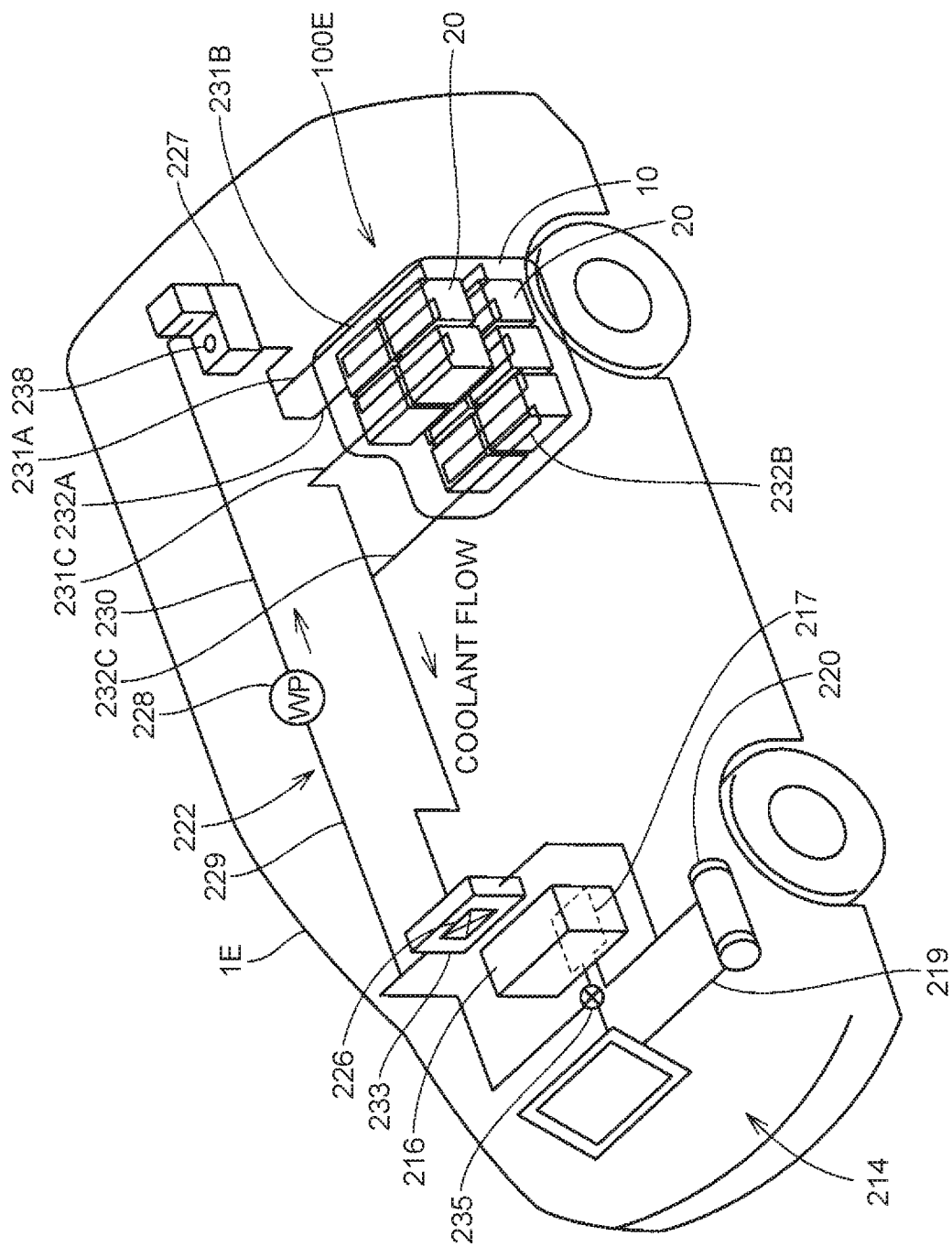
FIG. 19 is a perspective view of a vehicle equipped with a battery pack according to Embodiment 6.

FIG. 19 is a perspective view of a vehicle equipped with a battery pack according to Embodiment 6. A vehicle 1E according to Embodiment 6 will be described with reference to FIG. 19.

As shown in FIG. 19, the vehicle 1E includes an air conditioner 214 and a battery pack 100E. The air conditioner 214 includes a temperature adjustment unit 216 and a refrigeration cycle. The temperature adjustment unit 216 houses an evaporator 217, a heater core (not shown), a blower (not shown), a damper, etc. The refrigeration cycle includes the evaporator 217, a coolant circulation path 219, a compressor 220, and an expansion valve (not shown). The evaporator 217, the compressor 220, and the expansion valve are connected to one another through the coolant circulation path 219.

This refrigeration cycle and the heater core are operated in combination, and moreover, the blower, the damper, etc. are driven, so as to send cold air or warm air adjusted to a predetermined temperature to a cabin of the vehicle 1E.

The battery pack 100E is different from the battery pack 100 according to Embodiment 1 in that a fire-extinguishing agent releasing unit is formed by a part of a cooling system 222, to be described later, that cools the plurality of battery modules, and that a coolant used in the cooling system 222 is used as the fire-extinguishing agent. The configurations of these embodiments are otherwise almost the same.

The cooling system 222 cools the battery modules 20 housed inside the pack case 10. The cooling system 222 uses the refrigeration cycle as a cooling source. The cooling system 222 includes a condenser tank 227, a coolant circulation path 229, a pump 228, and a heat sink 226. The condenser tank 227, the pump 228, and a cooler 233 are connected to one another through the coolant circulation path 229.

The condenser tank 227 stores the coolant. The condenser tank 227 is configured so that the coolant can be supplied thereto from outside. The specific configuration of the condenser tank 227 will be described later using FIG. 20 and FIG. 21.

The coolant circulation path 229 is a channel through which the coolant circulates. A part of the coolant circulation path 229 that is arranged inside the pack case 10 corresponds to the fire-extinguishing agent releasing unit.

The coolant circulation path 229 has a main pipe 230, a first inlet pipe 231A, a first in-pack pipe 231B, a first outlet pipe 231C, a second inlet pipe 232A, a second in-pack pipe 232B, and a second outlet pipe 232C.

The main pipe 230, the first inlet pipe 231A, the first outlet pipe 231C, the second inlet pipe 232A, and the second outlet pipe 232C are disposed outside the pack case 10. The first in-pack pipe 231B and the second in-pack pipe 232B are disposed inside the pack case 10.

The main pipe 230 mainly connects the heat sink 226, the pump 228, and the condenser tank 227 to one another. The first inlet pipe 231A and the second inlet pipe 232A are connected to one end of the main pipe 230.

The first inlet pipe 231A is connected to one end of the first in-pack pipe 231B. The first inlet pipe 231A guides the coolant flowing through the main pipe 230 into the first in-pack pipe 231B.

The second inlet pipe 232A is connected to one end of the second in-pack pipe 232B. The second inlet pipe 232A guides the coolant flowing through the main pipe 230 into the second in-pack pipe 232B.

The first outlet pipe 231C connects the other end of the main pipe 230 and the other end of the first in-pack pipe 231B to each other. The first outlet pipe 231C guides the coolant flowing through the first in-pack pipe 231B to the main pipe 230.

The second outlet pipe 232C connects the other end of the main pipe 230 and the other end of the second in-pack pipe 232B to each other. The second outlet pipe 232C guides the coolant flowing through the second in-pack pipe 232B to the main pipe 230.

The pump 228 circulates the coolant through the coolant circulation path 229. The heat sink 226 is built in the cooler 233 that is connected in parallel with the evaporator 217. The heat sink 226 exchanges heat with the cooler 233 cooled by the refrigeration cycle. As a result, the coolant inside the coolant circulation path 229 is cooled.

The coolant cooled in the heat sink 226 is driven by the pump 228 to circulate through the coolant circulation path 229. As the coolant flows through the first in-pack pipe 231B and the second in-pack pipe 232B, the first module 25 and the second module 26 inside the pack case 10 are cooled.

A switching valve 235 can be switched so that the coolant flowing through the refrigeration cycle flows toward the cooler 233.

Figure 20:
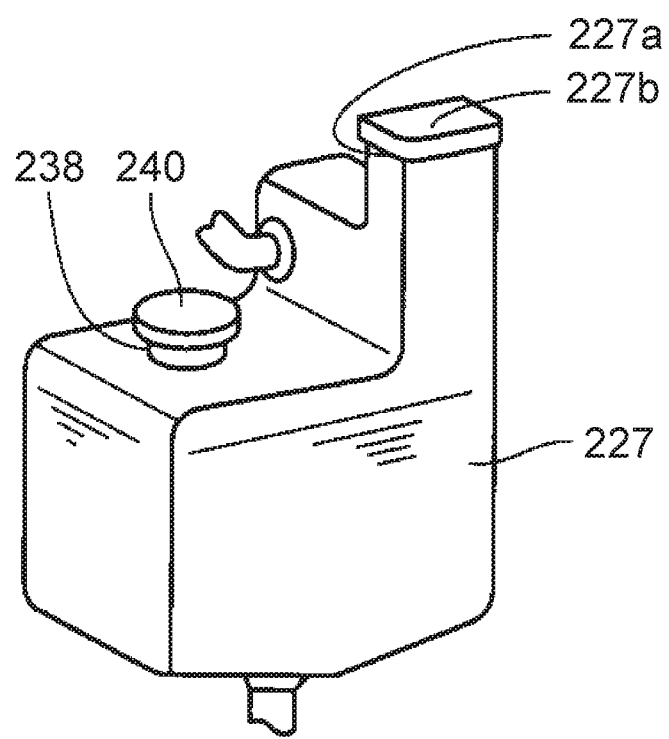
FIG. 20 is a perspective view showing a condenser tank that is used in a cooling system that cools battery modules inside the battery pack according to Embodiment 6.
Figure 21:
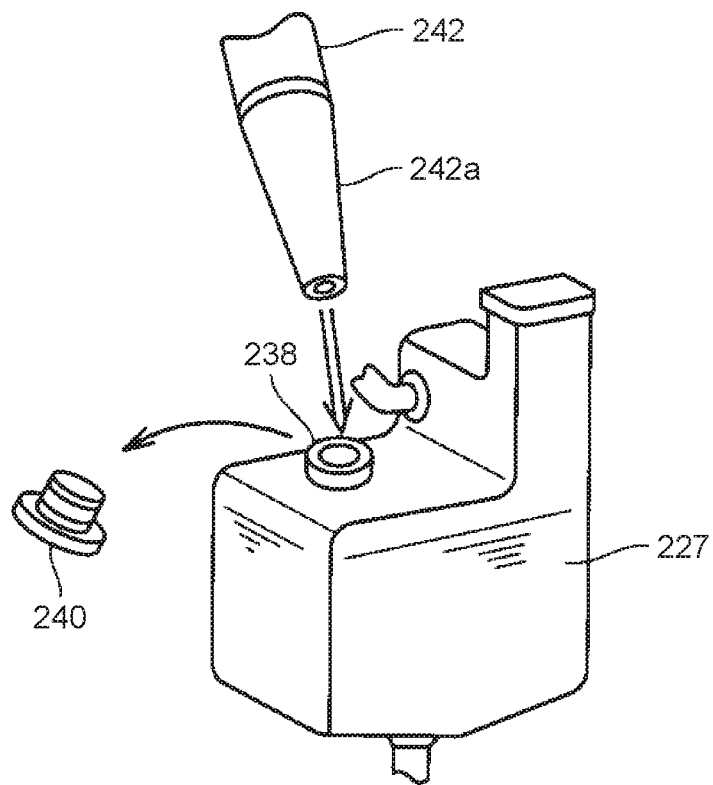
FIG. 21 is a view showing a state where a fire-extinguishing agent is supplied from outside into the condenser tank shown in FIG. 20.

FIG. 20 is a perspective view showing the condenser tank used in the cooling system that cools the battery modules inside the battery pack according to Embodiment 6. FIG. 21 is a view showing a state where a fire-extinguishing agent is supplied from outside into the condenser tank shown in FIG. 20.

As shown in FIG. 20, the condenser tank 227 has a second coolant feed port 238 in addition to a first coolant feed port 227a that is commonly provided.

The first coolant feed port 227a is closed by a lid 227b. In a normal service environment, when the coolant needs to be fed, the lid 227b is removed and a desired amount of coolant is fed.

As shown in FIG. 21, the second coolant feed port 238 is covered with a lid 240. The second coolant feed port 238 is configured so that a nozzle 242a of a fire-extinguishing agent supply member 242 can be inserted into the second coolant feed port 238. For example, a watering hose extending from a fire-fighting vehicle or fire-fighting equipment can be used as the fire-extinguishing agent supply member 242. In this case, water can be used as the fire-extinguishing agent that is supplied from the fire-extinguishing agent supply member 242.

Here, as shown in FIG. 19, the first in-pack pipe 231B is disposed between the first module 25 and the pack case 10. Specifically, the first in-pack pipe 231B is disposed between the first module 25 and the upper wall of the pack case 10.

For example, the first in-pack pipe 231B has a meandering shape that extends along the left-right direction of the vehicle while meandering. However, the shape of the first in-pack pipe 231B is not limited to the meandering shape and can be changed as appropriate.

It is preferable that a front part of the first in-pack pipe 231B be located above the front wiring of the wiring 50. Moreover, it is preferable that the front part of the first in-pack pipe 231B be located above the connection wiring.

While the coolant is flowing through the coolant circulation path 229, the first in-pack pipe 231B is filled with the coolant. Moreover, the first in-pack pipe 231B is formed by a resin member etc. and configured to be meltable by heat. Thus, the first in-pack pipe 231B corresponds to a part of the fire-extinguishing agent releasing unit.

The second in-pack pipe 232B is disposed above the second module 26, between the second module 26 and the upper wall of the pack case 10. More specifically, the second in-pack pipe 232B is disposed between the first module 25 and the second module 26.

The second in-pack pipe 232B has a meandering shape that extends along the left-right direction of the vehicle while meandering. However, the shape of the second in-pack pipe 232B is not limited to the meandering shape and can be changed as appropriate.

While the coolant is flowing through the coolant circulation path 229, the second in-pack pipe 232B is filled with the coolant. Moreover, the second in-pack pipe 232B is formed by a resin member etc. and configured to be meltable by heat. Thus, the second in-pack pipe 232B corresponds to another part of the fire-extinguishing agent releasing unit.

Thus, if the wiring 50 gets caught and broken between the battery module 20 and the pack case 10 as a result of a collision of the vehicle, the coolant is released between the pack case 10 and the module case 22 as the first in-pack pipe 231B and the second in-pack pipe 232B are heated and melted under the heat generated from the break in the wiring Thus, when heat is generated inside the pack case 10, the coolant can be quickly released between the pack case 10 and the module case 22, without the need to wait for the arrival of a worker who supplies a fire-extinguishing agent from outside.

As the battery assembly is housed inside the module case 22, even when the coolant is released from at least one of the first in-pack pipe 231B and the second in-pack pipe 232B due to accidental activation, this coolant is not directly supplied toward the battery assembly. Thus, it is possible to avoid a situation in which the fire-extinguishing agent released due to accidental activation of the fire-extinguishing agent releasing unit causes short-circuit of the battery assembly disposed inside the module case 22.

As has been described above, the battery pack 100E according to Embodiment 6 can also offer advantages similar to those of the battery pack 100 according to Embodiment 1.

When a part of the first in-pack pipe 231B is located above the front-side wiring or above the connection wiring, the fire-extinguishing agent can be released specifically toward the front-side wiring or the connection wiring.

When the fire-extinguishing agent supply member 242 is used to supply the fire-extinguishing agent to the coolant circulation path 229 through the condenser tank 227, the inside of the pack case 10 can be cooled more reliably.

Figure 22:
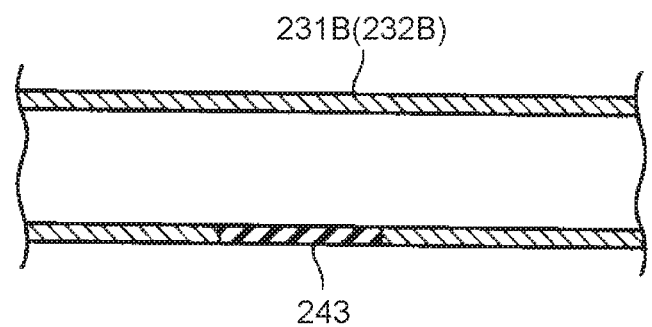
FIG. 22 is a view showing a modified example of a first in-pack pipe and a second in-pack pipe.

FIG. 22 is a view showing a modified example of the first in-pack pipe and the second in-pack pipe. The modified example of the first in-pack pipe 231B and the second in-pack pipe 232B will be described with reference to FIG. 22.

In Embodiment 6, the case where the first in-pack pipe 231B and the second in-pack pipe 232B are configured to be entirely meltable by heat has been described as an example, but the configuration of the in-pack pipes is not limited to this example.

As shown in FIG. 22, the first in-pack pipe 231B and the second in-pack pipe 232B may be configured to be only partially meltable by heat. Specifically, the first in-pack pipe 231B and the second in-pack pipe 232B have a shell portion 243 that can be melted by heat. The shell portion 243 may be provided as spots at a plurality of positions, or may be provided so as to extend in an elongated shape. The shell portion 243 is formed by a resin member. For example, the rest of the first in-pack pipe 231B and the second in-pack pipe 232B is formed by a metal member.

When this configuration is adopted, if heat is generated inside the pack case 10, the coolant is released from the first in-pack pipe 231B and the second in-pack pipe 232B into the pack case 10 as the shell portion 243 is heated and melted. In this case, too, the coolant can be quickly released between the pack case 10 and the module case 22, without the need to wait for the arrival of a worker who supplies a fire-extinguishing agent from outside. When the shell portion 243 is provided at a position above the front-side wiring etc., the fire-extinguishing agent can be released specifically toward the break in the wiring and the wiring. Thus, it is possible to reduce the consumption of the fire-extinguishing agent and yet suppress the temperature rise of the wiring that constitutes a heat conduction path.

In Embodiment 1 to Embodiment 6, the case where the plurality of battery modules 20 are disposed inside the pack case 10 has been described as an example. However, the present disclosure is not limited to this example, and a single battery module 20 may be disposed.

In Embodiment 1 to Embodiment 6, the case where the wiring 101 is connected to the wiring harness 6 that is connected to the CPU 4 disposed in the engine compartment 8a has been described as an example. However, the present disclosure is not limited to this example. For example, when another battery pack is separately provided under a floor panel at a center part of the vehicle 1, the wiring 101 may be connected to a junction box that is disposed inside this battery pack.

The configurations of the battery packs according to Embodiment 1 to Embodiment 6 can also be adopted for the separately installed battery pack. In this case, when the fire-extinguishing agent-enclosing body 99 is disposed above the wiring 101 that connects the original battery pack and the separately installed battery pack to each other, it is possible to prevent heat from being conducted through the wiring 101 from one of the original battery pack and the separately installed battery pack to the other.

In Embodiment 1 to Embodiment 5, the case where the fire-extinguishing agent-enclosing body constituting a part of the fire-extinguishing agent releasing unit has the sealed part extending in a longitudinal direction and the fire-extinguishing agent has been described as an example. However, the present disclosure is not limited to this example. Alternatively, the fire-extinguishing agent-enclosing body may be composed of a plurality of capsule-like sealed parts that are arrayed in a row and a fire-extinguishing agent that is packed in each of these sealed parts. In this case, too, as the sealed parts are melted by heat, the fire-extinguishing agent is released to the outside of these sealed parts.

In Embodiment 4, the case where the openings 15a, 15b, 15c and the openings 16a, 16b, 16c are formed in the peripheral wall of the pack case 10 has been described as an example. However, the number of the openings is not limited, as long as the fire-extinguishing agent releasing unit includes a part that is located above the opening, on the inner side of the peripheral wall in which the opening is formed. A single opening may be formed in the peripheral wall.

The characteristic configurations described in Embodiment 1 to Embodiment 6 may be combined as appropriate without departing from the gist of the present disclosure.

The embodiments disclosed herein are not restrictive but illustrative in every respect. The scope of the present disclosure is defined by the claims, and all possible modifications equivalent in meaning and scope to the claims are included in the scope of the present disclosure.

What is claimed is:

1. A battery pack installed in a vehicle, the battery pack comprising:
    a battery assembly;
    a battery module including a module case that houses the battery assembly;
    a pack case that houses the battery module;
    a fire-extinguishing agent releasing unit including fire-extinguishing agent, disposed between the battery module and the pack case, wherein the fire fire-extinguishing agent releasing unit is configured to release the fire-extinguishing agent between the pack case and the module case;
    wiring arranged between the module case and the pack case;
    wherein the fire-extinguishing agent releasing unit is configured to release the fire-extinguishing agent toward the wiring; and
    an electronic device disposed outside the module case but inside the pack case, wherein
    the wiring includes connection wiring that connects the battery module and the electronic device to each other, and
    the fire-extinguishing agent releasing unit includes a part that is provided along the connection wiring.

2. A battery pack installed in a vehicle, the battery pack comprising:
    a battery assembly;
    a battery module including a module case that houses the battery assembly;
    a pack case that houses the battery module;
    a fire-extinguishing agent releasing unit including fire-extinguishing agent, disposed between the battery module and the pack case, wherein the fire fire-extinguishing agent releasing unit is configured to release the fire-extinguishing agent between the pack case and the module case; and
    wiring arranged between the module case and the pack case, wherein the fire-extinguishing agent releasing unit is configured to release the fire-extinguishing agent toward the wiring, wherein
    the pack case includes a front wall, and a rear wall, arranged such that the front wall and the rear wall face each other in a front-rear direction of the vehicle,
    the wiring includes front-side wiring that is arranged inside the pack case, between the front wall and the battery module, and
    at least a part of the fire-extinguishing agent releasing unit is disposed above the front-side wiring.

3. The battery pack according to claim 2, wherein
    the pack case includes a partition extending from a side of the rear wall toward a front side of the vehicle,
    the partition separates an inside of the pack case into an upper space and a lower space, and
    at least a part of the front-side wiring passes through a clearance between a front end of the partition and the front wall.

4. A battery pack installed in a vehicle, the battery pack comprising:
    a battery assembly;
    a battery module including a module case that houses the battery assembly;
    a pack case that houses the battery module;
    a fire-extinguishing agent releasing unit including fire-extinguishing agent, disposed between the battery module and the pack case, wherein the fire fire-extinguishing agent releasing unit is configured to release the fire-extinguishing agent between the pack case and the module case; and
    outside wiring that is routed out of the pack case, wherein at least a part of the fire-extinguishing agent releasing unit is disposed above the outside wiring.

5. A battery pack installed in a vehicle, the battery pack comprising:
    a battery assembly;
    a battery module including a module case that houses the battery assembly;
    a pack case that houses the battery module; and
    a fire-extinguishing agent releasing unit including fire-extinguishing agent, disposed between the battery module and the pack case, wherein the fire fire-extinguishing agent releasing unit is configured to release the fire-extinguishing agent between the pack case and the module case, wherein
    the pack case includes a front wall, a rear wall, and a peripheral wall,
    the front wall and the rear wall are arranged such that the front wall and the rear wall face each other in a front-rear direction of the vehicle,
    the peripheral wall connects a peripheral edge of the front wall and a peripheral edge of the rear wall to each other, includes an opening, and
    at least a part of the fire-extinguishing agent releasing unit is disposed above the opening, on an inner side of the peripheral wall.

* * * * *